United States Patent [19]
Cerny et al.

[11] 3,840,709
[45] Oct. 8, 1974

[54] BUSY OUTLET GROUP CONTROL FOR SWITCHING SYSTEM

[75] Inventors: Louis Joseph Cerny, Long Island; Herbert Albert Rupprecht, Farmingdale, both of N.Y.

[73] Assignee: American Telephone and Telegraph Company, New York, N.Y.

[22] Filed: June 25, 1973

[21] Appl. No.: 373,405

[52] U.S. Cl. ........................ 179/18 EA, 179/18 AB
[51] Int. Cl. ............................................ H04m 3/22
[58] Field of Search ....... 179/18 EA, 18 AB, 18 AH

[56] References Cited

UNITED STATES PATENTS 3,513,262 5/1970 Fukutomi et al. .............. 179/18 EA
3,564,149 2/1971 Funk et al. ...................... 179/18 ES

*Primary Examiner*—Thomas W. Brown
*Attorney, Agent, or Firm*—S. N. Turner

[57] ABSTRACT

A common control crossbar telephone switching system is disclosed wherein originating markers attempt to effect connections toward switching destinations by searching for idle trunks among groups of trunks representing alternate switching routes toward those destinations. Provided in common to all markers is a trunk group busy circuit having four parts, each part having a separate timer and arranged to function with respect to one-fourth of the trunk groups being controlled by the group busy circuit. Any marker finding all trunks busy in a searched group causes an indication of that fact to be registered in the appropriate part of the trunk group busy circuit, such registration causing the associated timer to measure a prescribed interval of time (such as any desired interval from one to ten seconds). The busy trunk group registration is retained until the end of the measured time interval regardless of how long the actual all-trunks-busy condition exits; and, at the end of the measured time interval, the busy trunk group registration is released. Each marker is controlled by any busy trunk group registration for eliminating the indicated trunk group from its searching operation.

14 Claims, 18 Drawing Figures

GROUP BUSY

GROUP BUSY

TRUNK GROUP BUSY TRANSFER

TRUNK GROUP BUSY TRANSFER
MKR 0

TRUNK GROUP BUSY TRANSFER

MKR 0

TRUNK GROUP BUSY TRANSFER

MKRS 1-7

BUSY OUTLET GROUP CONTROL FOR SWITCHING SYSTEM

BACKGROUND OF THE INVENTION

The invention lies in the general field of switching systems and particularly relates to the switching function of ascertaining the busy-idle status of switching network outlets representing switching routes toward desired switching destinations. For example, in a telephone switching system such a switching function comprises searching for an idle trunk over which to attempt to complete part of a desired connection from a calling customer to a desired destination, such as an identified called customer.

Switching systems are usually engineered to provide more than one group of outlets representing alternate switching routes toward particular switching destinations. The outlet searching function usually conforms to a so-called alternate route pattern which prescribes the order in which control circuitry searches among successive groups of outlets.

The so-called brute-force outlet searching function of the prior art requires each switching control circuit to successively connect to successive groups of outlets according to an alternate route pattern and to test for availability in each connected group until a group is found containing at least one idle outlet which may be seized for use. This approach to the outlet searching function enables switching control circuitry to ascertain the current status of outlet groups each time such a function is required; but, the control circuitry is provided with no advance information to enable the skipping of busy groups so as to eliminate such busy groups from the searching operation.

A prior art solution to the skipping problem provides an outlet group monitoring circuit separate from but common to all switching control circuits and which monitoring circuit constantly maintains an up-to-date status condition of outlet groups. The common monitoring circuit is accessible from any control circuit to provide to such control circuit advance information as to the busy-idle status of outlet groups. That approach solves the problem but necessitates considerably wiring from the monitoring circuit to each outlet group in addition to the necessary access from control circuits to outlet groups and to the monitoring circuit.

The above type of prior art solution to the problem of how to enable switching control circuits to eliminate busy outlet groups from its searching functions (that is, to skip such busy groups) has been quite successful. However, ever present concern about potential cost savings constantly draws attention to complicated and extensive wiring in a switching office, the cost of which is considerable and the elimination or reduction of which cost is always desirable.

Reduction in the amount of wiring involved in the prior art approach to solving the busy outlet group skipping problem is the main object of the present invention.

SUMMARY OF THE INVENTION

The present invention enables switching control circuits to skip busy outlet groups without requiring extensive additional (other than the usual access to outlet groups for searching and seizing) wiring between outlet groups and outlet group monitoring circuitry.

According to the invention, any control circuit finding a busy outlet group during a search function causes an indication of the busy condition to be stored in storing means; the stored busy indication will be removed or erased within a prescribed time independent of the time duration of the actual group busy condition; and, each control circuit is controlled by any stored group busy indication to eliminate such indicated group from its searching operation (i.e., skips that group).

The above summary of the invention is implemented according to the exemplary embodiment (1) by providing storage means common to all control circuits and to which storage means all control circuits have access so that any control circuit can store a busy outlet group indication and so that any control circuit can ascertain any such stored indication and (2) by providing means for erasing a stored indication after a prescribed storage time independent of the actual time during which the indicated outlet group is actually busy. This arrangement eliminates the necessity of any wiring or connection between the storage means and the outlet groups.

According to a particular feature of the invention, a number of storage means may be provided, each with its own erasure time control and each serving a different plurality of outlet groups. In this manner, the erasure time control individual to each storage means may have its own particular time interval (the same as or different from other storage means) and outlet groups may be arranged in different pluralities of groups according to many factors.

According to another feature of the invention, each control circuit is provided with means for ascertaining from the storage means which outlet group or groups are then indicated as busy and means controlled by the ascertaining means for eliminating such group or groups (i.e., skips such groups) from the searching operation.

The erasure time control for the storage means may be chosen so that the busy group indication is retained long enough to be useful without being so long as to amount to a busy group time indication greatly exaggerated from the amount of time the group is actually busy. Since the erasure time control does not represent the true busy time of an outlet group, the control circuits are forced to operate under assumed conditions which at times will of course be false; however, the arrangement of outlet groups into different pluralities of groups with different erasure time durations can be engineered such as to reduce the amount in time of false indications so as to render the saving in wiring installation and maintenance costs favorable even in view of the lack of strictly accurate group busy time indications.

BRIEF DESCRIPTION OF THE DRAWING

The drawing consists of eighteen FIGS. arranged on seventeen sheets and is briefly describable as to its parts as follows.

DETAILED DISCLOSURE

Figure 1:
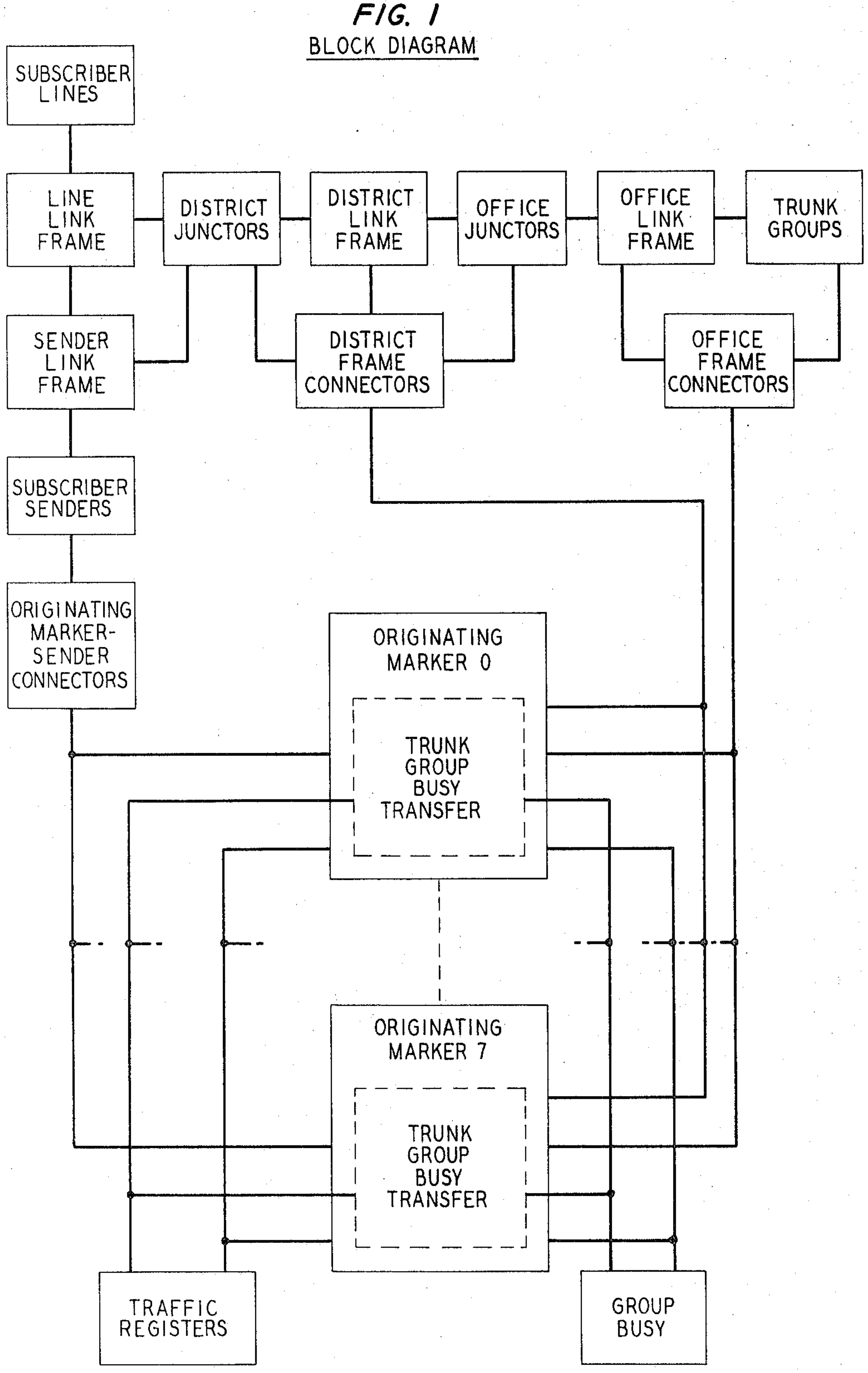
FIG. 1 is a block diagram showing the functional relationship of various major components of a marker controlled crossbar telephone switching office.

The description of the exemplary embodiment is arranged according to the following main and subsidiary headings:

CIRCUIT SYMBOLS
The Prior Art Context
Dashed Lines
Boxes
Detached Contacts
Reference Numerals
Miscellaneous
THE BLOCK DIAGRAM (FIG. 1)
DETAILED DESCRIPTION
SWITCH S-POSITION 1
Route Relay Arrangement
Functions of Route Relays
Call Assumptions
First Subgroup of First Choice Subgroups of Direct Route
Second Subgroup of First Choice Subgroups of Direct Route
First Choice Subgroup of Alternate Route
Second Choice Subgroup of Alternate Route
Overflow Route
Trouble Release to Sender
Traffic Register Operation
SWITCH S-POSITION 2
Group Busy Timers
Group Busy Registration
Transfer Relay Operation
Group Busy Time-Out
Summary of Group Busy Operation
Summary of Relays TR00 through TR59
Operation With No Pertinent Relay TR—(9) Operated
Operation With Relay TR—(9) Operated
Summary of Control by Relays TR—(9)
Miscellaneous Remarks

CIRCUIT SYMBOLS

Aside from the conventional symbols used in the schematic drawing, a few warrant explanation.

The Prior Art Context

The block diagram of FIG. 1 illustrates the functional relationship of various portions of the well-known Bell System No. 1 Crossbar telephone switching system, particularly those portions involved in the originating of a call as fully disclosed in U.S. Pat. No. 2,235,803 to W. W. Carpenter of Mar. 18, 1941, hereinafter referred to as Carpenter. Carpenter is incorporated herein by reference and is considered as modified by the addition to each marker of trunk group busy transfer circuitry, by the addition of group busy circuitry common to all markers, and by modification of the common traffic register circuitry, all according to the illustrative embodiment disclosed herein.

FIGS. 11 through 18 show those parts of the Carpenter originating marker 0 which are considered necessary for an understanding of the invention. In FIGS. 11 and 13 through 18 are found switches S resting on their positions 2 with dotted lines indicating that switches S are movable to their positions 1. All of these switches S are assumed to take their positions 1 at the same time or to take their positions 2 at the same time, positions 1 corresponding to the prior art circuitry of Carpenter and positions 2 corresponding to the circuitry of Carpenter modified according to the exemplary embodiment of the present invention, as will be explained.

Dashed Lines

Figure 2:
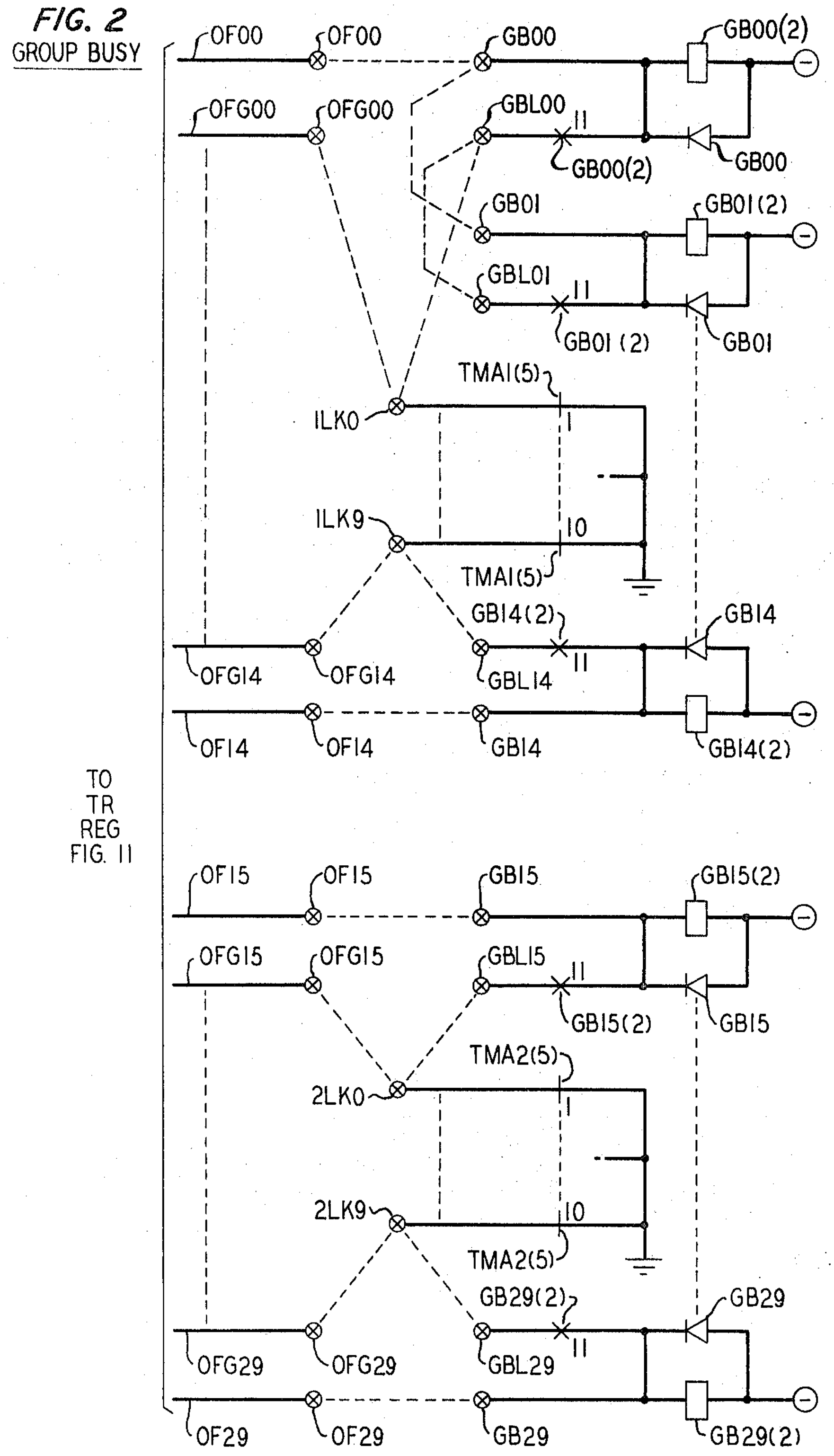
FIGS. 2 through 6 provide details of the group busy circuit shown in common to the markers of FIG. 1.

Dashed lines are used in two ways to indicate (1) an obvious repeated circuit pattern and (2) cross-connections between terminal punchings. In FIG. 2, for instance, a dashed line is shown between the circuitry for relays GB01(2) and GB14(2) to indicate the presence of the obvious circuitry for the intervening relays GB02 through GB13. Also, in FIG. 2, for example, a dashed line is used as the cross-connection between terminal punchings OF00 and GB00, etc.

Boxes

Figure 6:
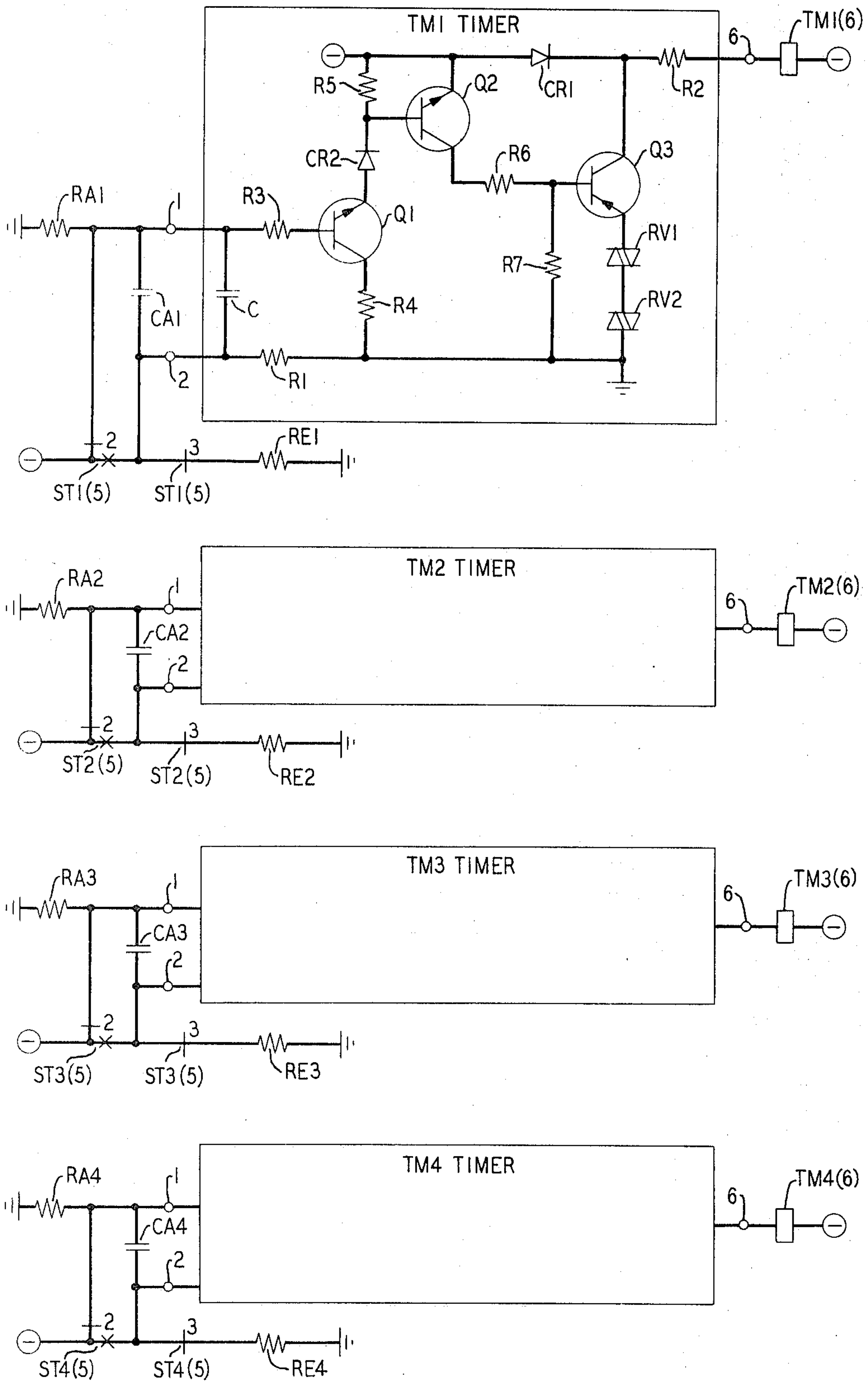
Figure 9:
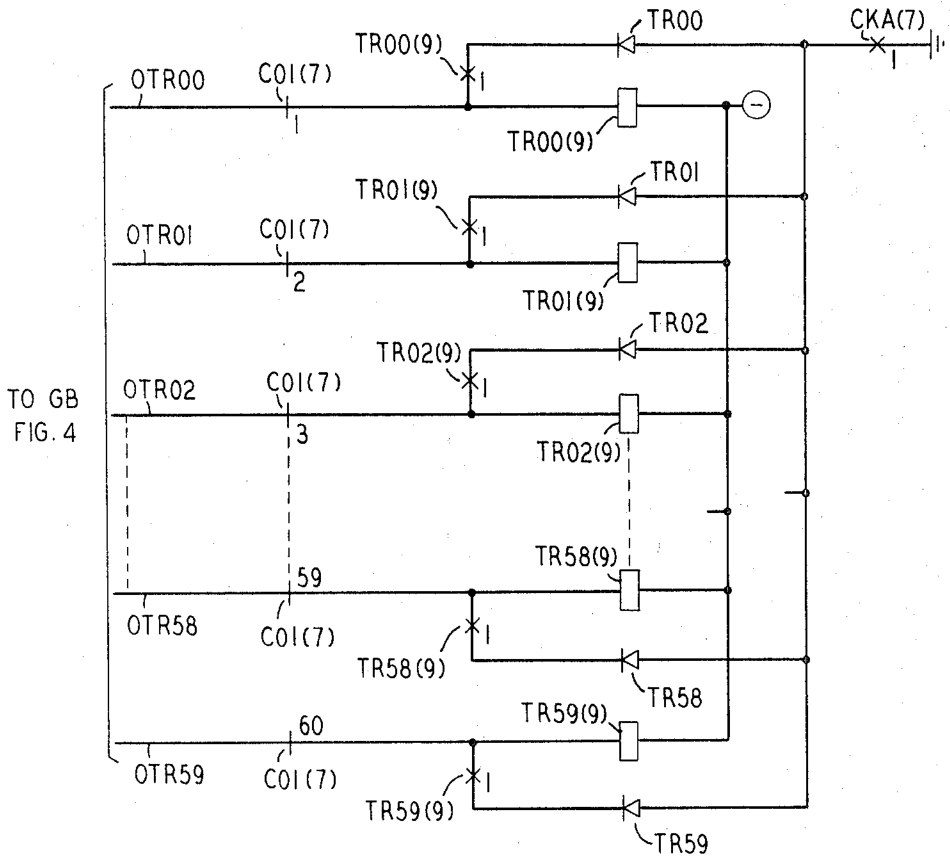
Figure 10:
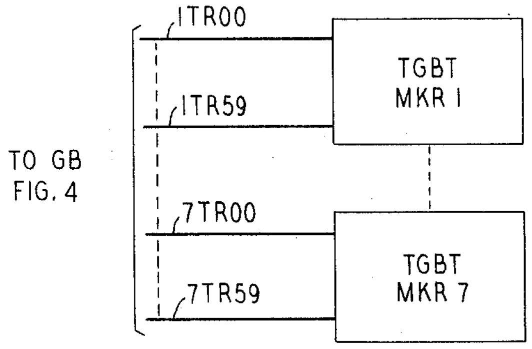
FIG. 10 indicates for markers 1 through 7 circuitry similar to that of FIG. 9 for marker 0.
Figure 15:
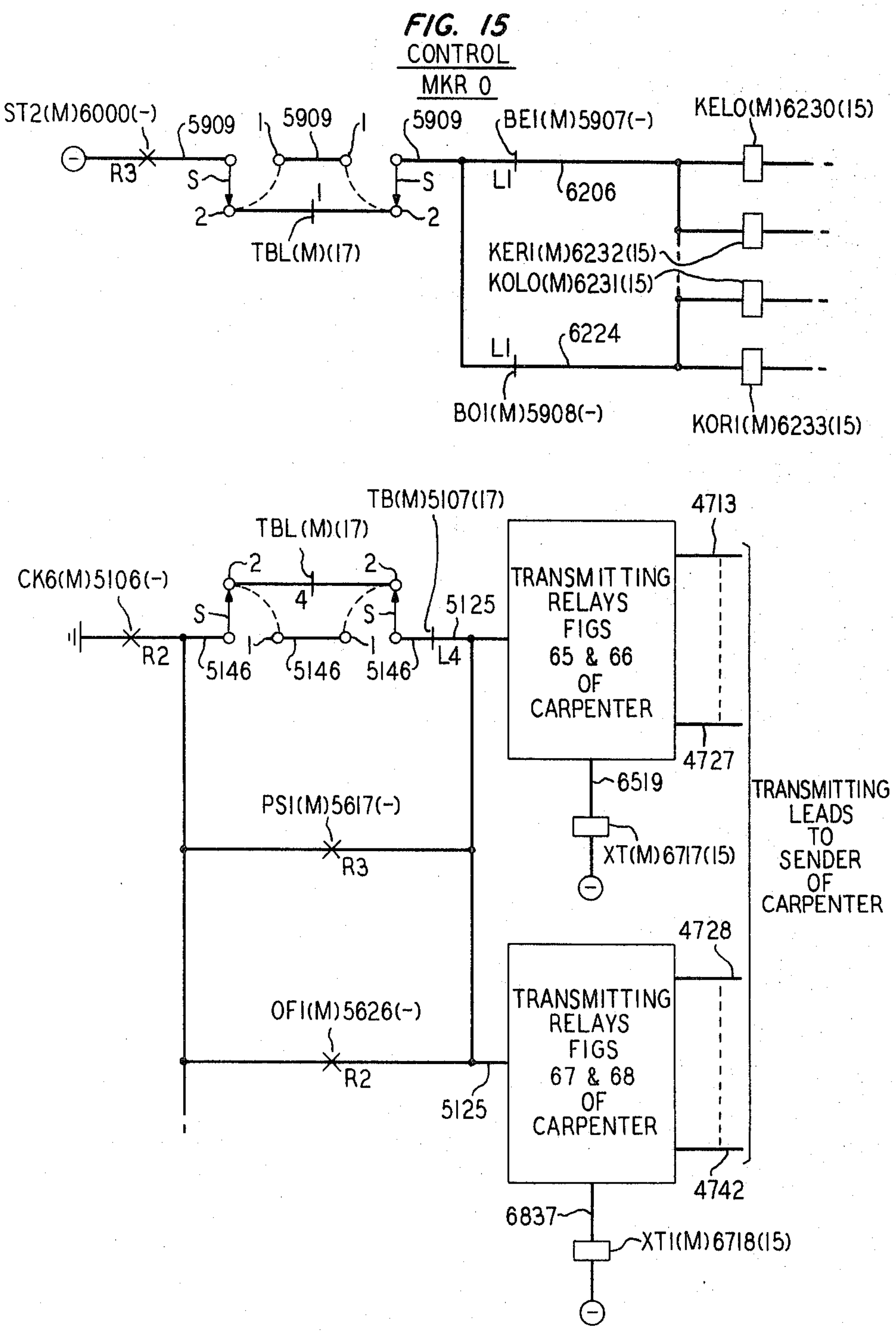
Figure 16:
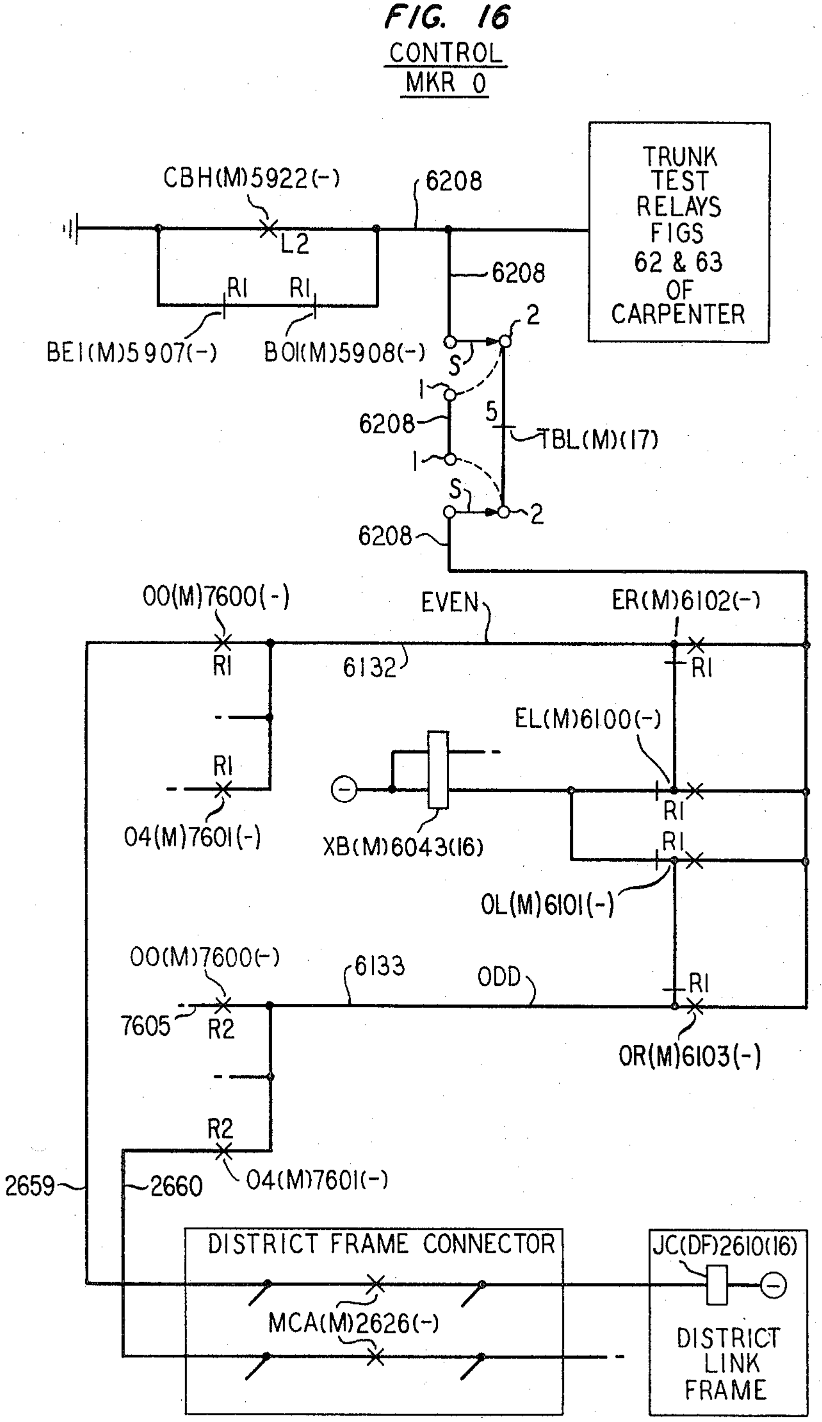
Figure 17:
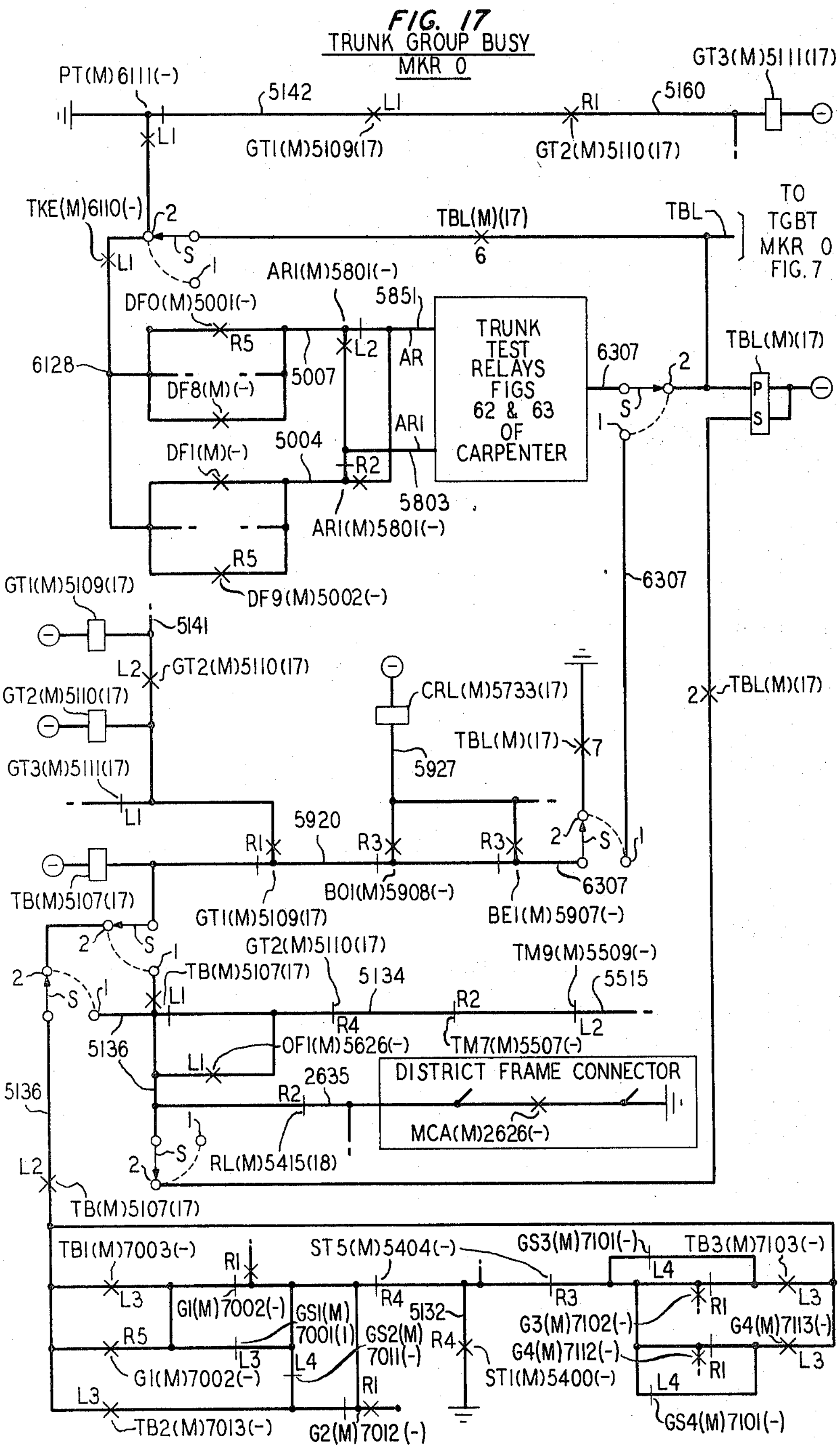
Figure 18:
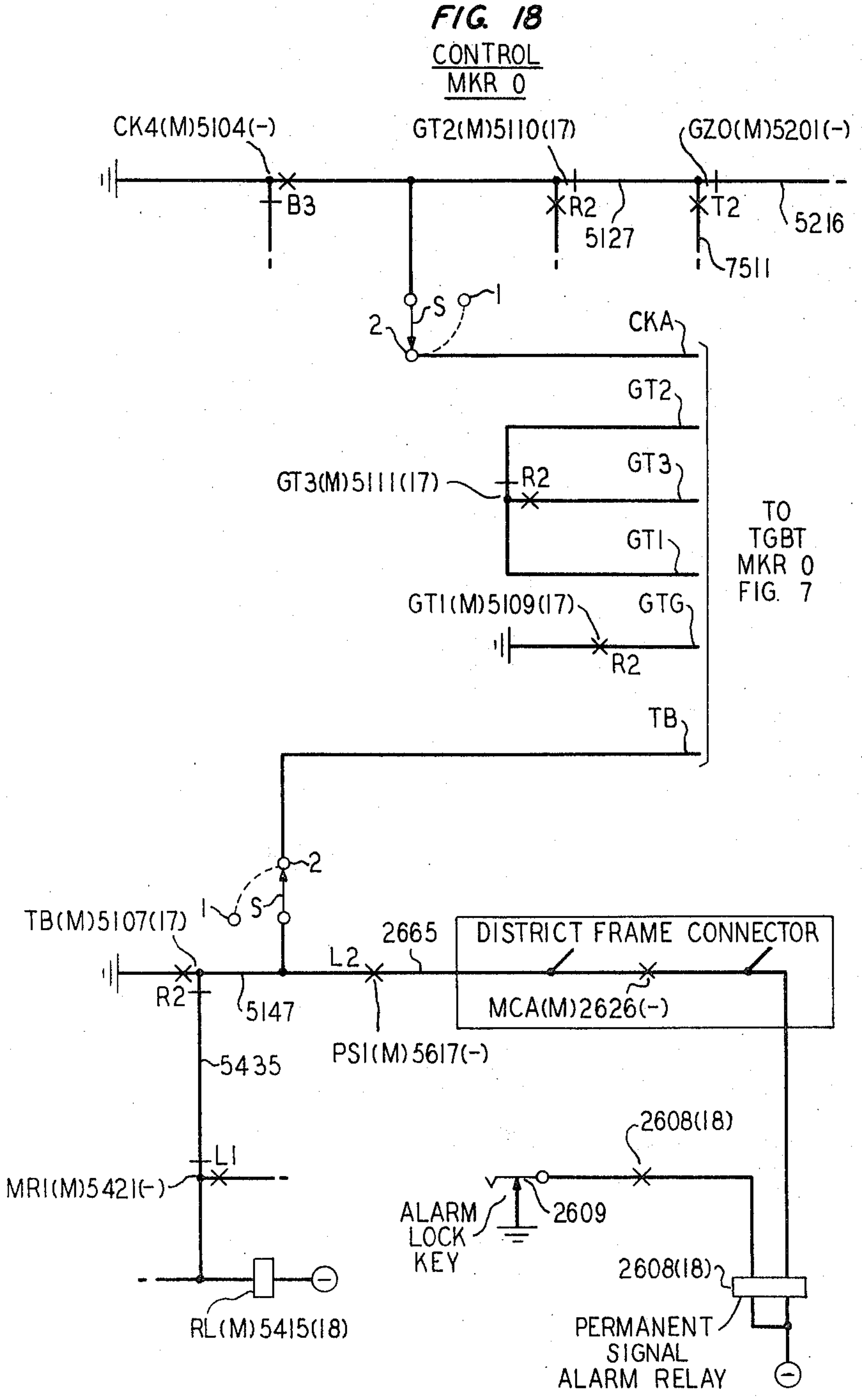

Boxes are used in three ways to indicate (1) unnecessary repetition of circuit detail, (2) functional parts of a marker where the details are unnecessary for present purposes but are fully disclosed in Carpenter, and (3) the confines of other (other than marker) circuits of Carpenter where only limited detail thereof is shown herein. In FIG. 6, timers TM2, TM3 and TM4 are shown as boxes which include the same detail shown for timer TM1. In FIG. 10 are indicated boxes for markers 1 through 7, which boxes include the same detail shown in FIG. 9 for marker 0. In FIGS. 15, 16 and 17, the Transmitting Relays of Carpenter FIGS. 65 and 66 and the Trunk Test Relays of Carpenter FIGS. 62 and 63 are indicated by boxes. In FIGS. 16, 17 and 18, part of the district frame connector circuitry of Carpenter is shown by boxes. In FIG. 16, part of the district link frame circuitry of Carpenter is shown by a box.

Detached Contacts

The disclosure of Carpenter is arranged according to the so-called attached contact type of schematic where each relay coil is associated on the drawing next to the relay contacts controlled thereby. The present disclosure, including parts of Carpenter, uses the so-called detached contact type of schematic where a relay coil does not necessarily appear next to, or even on the same sheet as the contacts controlled thereby. A front or make contact (actually a pair of contacts) is in an open condition when the relay is released and is in a closed condition when the relay is operated; whereas, a back or break contact has the reverse conditions. A make contact is shown as a cross on a conductor, such as make contact 11 of relay GO00(2) in FIG. 2. A break contact is shown as a line perpendicular to and crossing a conductor, such as break contact 1 of relay TMA1(5) in FIG. 2. A transfer contact is a combination of the make and break contact symbols, such as transfer contact 11 of relay TMA1(5) in FIG. 5. As mentioned above, the Carpenter circuitry shown in FIGS. 11 through 18 has been translated into the detached contact type of schematic.

Reference Numerals

Figure 11:
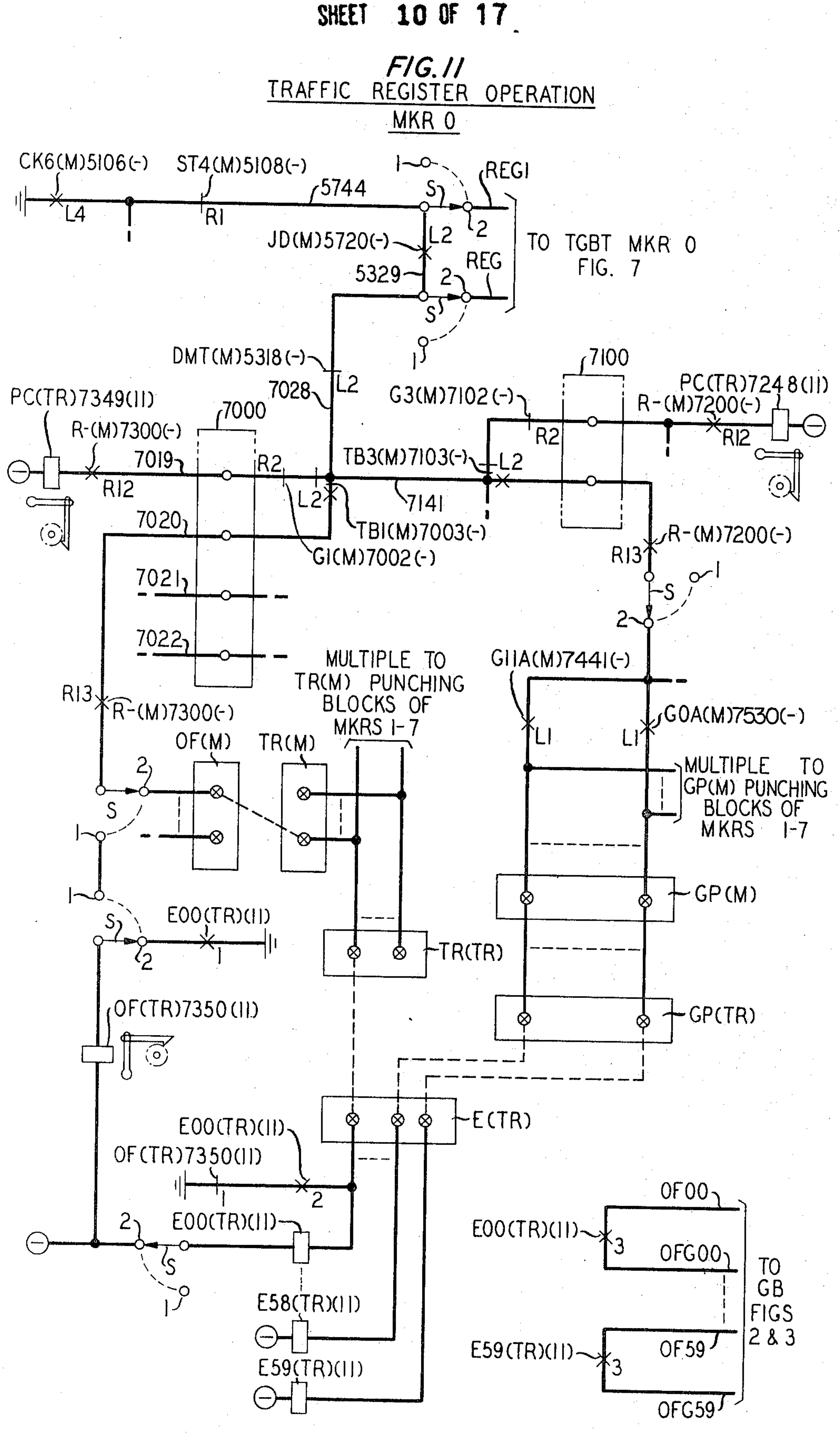
FIG. 11 shows part of the traffic register circuit indicated in FIG. 1 as common to markers 0 through 7 and shows some circuitry of marker 0 for controlling the peg count and overflow registers; and, FIGS. 12 through 18 show some details of a modified marker 0.

The relays, etc., of Carpenter are identified generally by a four-digit number, such as relay 5108, where the first two digits 51 identify the Carpenter FIG. number whereon relay 5108 is shown. This relay is identified herein as relay ST4(M)5108(—): ST4 is the functional desgination of relay 5108; M indicates that the ST4 relay is relay 5108 of the marker of Carpenter; and, (—) indicates that the ST4 relay coil is not shown herein even through the present drawing may include one or more of its contacts. The marker relay 6717 is shown herein as relay XT(M)6717(15), indicating that the control coil thereof is on FIG. 15 of the present drawing. In FIG. 11 of the present disclosure, the peg count register 7349 of the Carpenter traffic register circuit is shown as PC(TR)7349(11); and, in the present FIG. 16 is shown the Carpenter district link frame relay 2610 as JC(DF)2610(16). A route relay of Carpenter, such as relay 7300, is shown herein as R—(M)730-0(—), the R— representing a numbered route relay. Certain relays shown herein and which have no counterpart in Carpenter are shown without a numerical designation, such as the E00 relay in FIG. 11 of the traffic register circuit and shown as E00(TR)(11), and such as the TBL relay in FIG. 17 of the marker and shown as TBL(M)(17).

Contacts of relays not in Carpenter are merely numbered, such as make contact 11 of relay GO00(2) in FIG. 2. Most contacts of relays of Carpenter are shown as viewed from the Carpenter drawing and are identified as counting the controlling relay armature or swinger outward from the coil in Carpenter, either to the left, to the right, to the top, or to the bottom. For instance, at the top of the present FIG. 11, make contact L4 of relay CK6(M)5106(—) is the left No. 4 make contact of Carpenter relay 5106 and break contact R1 of relay ST4(M)5108(—) is the right No. 1 break contact of Carpenter relay 5108; whereas, at the top of the present FIG. 18, transfer contact B3 of relay CK4(M)5104(—) is the bottom No. 3 transfer contact of Carpenter relay 5104 and transfer contact T2 of relay GZO(M)5201(—) is the top No. 2 transfer contact of Carpenter relay 5201. In a few cases contacts have been added to relays, etc., of Carpenter, either as additional contacts in a certain direction from the coil or as contacts where Carpenter shows none. For instance, in the present FIG. 11 break contact 1 of the overflow traffic register OF(TR)7350(11) represents a break contact controlled by that register 7350 shown in Carpenter as not controlling any contacts. Also, in the present FIG. 18, transfer contact R2 of relay GT3(M)5111(17) is a new transfer contact added to the right of the coil of relay 5111 of Carpenter. In a few instances in Carpenter, a relay or connector contact was given a four-digit number identification, two such instances occurring in the present FIG. 13 as contact 7309 of route relay R—(M)730-0(—) and as contact 7209 of route relay R—(M)720-0(—), etc.

Conductor reference numerals of Carpenter are four-digit numbers as in the case of relays. These conductor numbers have been used herein. In a few case, such as in the present FIG. 13, two sets of such leads have been shown (such as leads 7218, 7223, 7247 and 7346) with one set carrying a parenthetical 1 and the other set carrying a parenthetical 2 to correspond to the two positions of the switches S. Where, as in the present FIG. 13 for example, it is necessary to refer to a Carpenter conductor not having a reference numeral in Carpenter, the conductor or lead is given an alphabetical designation, such as A(1), A(2), B(1), B(2), etc.

Figure 13:
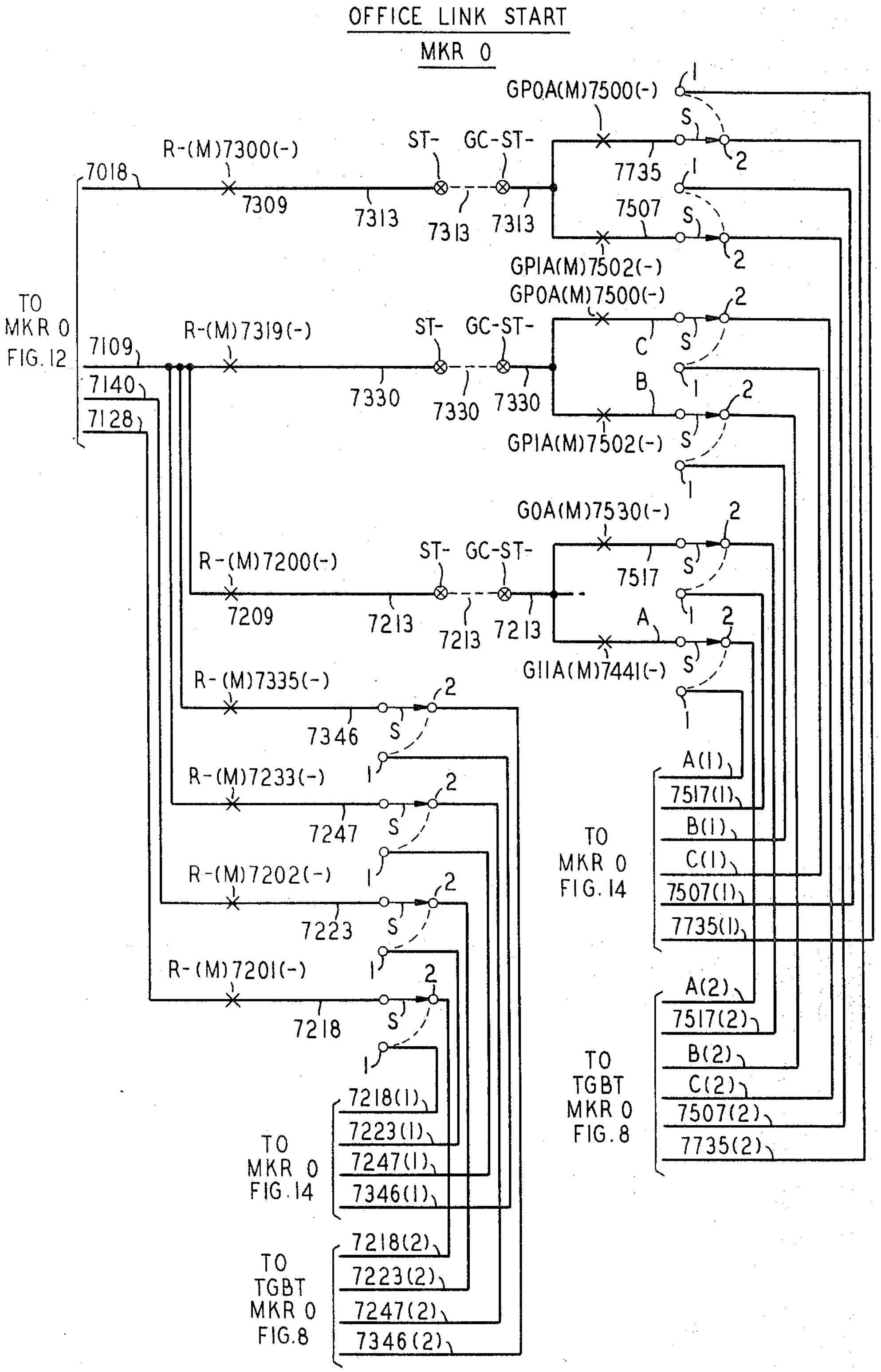

Some relay contacts are not identifiable as a certain number of armatures or swingers from the relay coil in Carpenter, in which case such contacts are left unidentified in the present drawing, such as the make contact of relay GPOA(M)7500(—) at the top of FIG. 13 connecting to lead 7735 at switch S, etc.

Miscellaneous

In the present FIG. 13, the Carpenter leads 7313, 7330 and 7213 have been broken open to show that these leads are connectable to terminal punchings with variable cross-connections.

It will be apparent that a small circle enclosing a minus sign signifies the negative terminal of a direct current power source (usually a 48 volt battery source) whose positive terminal is grounded.

THE BLOCK DIAGRAM (FIG. 1)

As mentioned above, the illustrative embodiment to be described in detail hereinafter is modification of an early version of the Bell System No. 1 Crossbar telephone switching system and particularly the part of such a system which is used during the originating of a call, as disclosed in Carpenter. FIG. 1 shows the general functional relationship of the major components of such a system and indicates the addition of the new group busy circuit and of the trunk group busy transfer circuit marker modifications. The detailed operation of such a system as disclosed in Carpenter is well known in the art; but, it is considered helpful to review briefly the overall operation thereof as a basis of departure for discussing the exemplary embodiment of the invention.

With respect to the markers, a marker is used for a short time during the establishment of a connection between a calling subscriber line and an outgoing trunk. The marker translates part of the dialed information, sets up certain conditions in a subscriber sender according to the nature of the desired switching destination (such as a terminating central office), searches for and chooses an idle trunk representing a switching route toward the desired switching destination, selects and completes an idle path from the trunk through idle office and district junctors to the calling line and to the subscriber sender, and then releases so that the subscriber sender may control the forward extension of the call.

During the initial stages of a call, a sender attaches itself to an idle marker and transmits to the marker, among other information, the office code digits of the called number. The marker uses this office code to control one or more route relays which in turn identify for the marker the location on the office link frames of the group or groups of trunks to be searched for possible seizure of an idle trunk for the switching route.

For certain switching routes there may be as many as four trunk groups, in an alternate route pattern, each of which groups must be searched in turn, according to the prior art circuitry of Carpenter, for an idle trunk if previous groups are all busy. In order for a marker to advance its trunk searching operation from one trunk group to another in the indicated alternate route pattern, the prior art requires the marker to actually seize each group for idle trunk testing and to advance to seizure of another group if the marker finds the first group all busy.

The present invention provides the Group Busy circuit of FIG. 1 in common to all markers, the Trunk Group Busy Transfer circuit modification of FIG. 1 to each marker, and modification to the common Traffic Register circuitry of FIG. 1. These additions and modifications enable a marker to ascertain in advance which trunk groups may be busy and thus to skip the testing of such groups as may be indicated as busy. In some cases traffic registers are used to recognize when a trunk group is busy, the operation of the usual overflow traffic register being the means of recognition. The operation of the overflow register for a particular trunk group, during the actual searching operation of a marker within that group, causes a registration of the group busy condition in the Group Busy circuit. After a prescribed time, such as a few seconds, the group busy registration is released, the time of registration being independent of the actual all-trunks-busy condition of the group. During the registration time, the Trunk Group Busy Transfer circuitry of each marker is controlled so as to skip such trunk groups during its trunk searching operation. In other cases, circuitry which otherwise would be used to control overflow registers, which however may not be provided, is used to control added relays for enabling registration of the group busy indication.

DETAILED DESCRIPTION

The following detailed description of the exemplary embodiment is divided into two main sections and a number of subsidiary sections according to the foregoing list of headings. The main heading "Switch S-Position 1" covers the operation of the Carpenter system as disclosed in the prior art. The main heading "Switch S-Position 2" describes the changes which occur in the prior art system due to the modifications and additions according to the exemplary embodiment of the invention.

SWITCH S-POSITION 1

As has been mentioned previously, with switch S in its position 1 circuitry of Carpenter is shown as unmodified. An outline of the circuit operation under these circumstances is considered helpful as a point of departure for later description of the changes which occur when switch S is moved to its position 2.

Route Relay Arrangement

The marker translates the called office code in order to control the operation of a route relay for a desired switching route. Switching routes are arranged in two classes, original or direct routes and alternate routes. A direct route provides a direct path to a destination; and, an alternate route is an indirect path to a destination for which a direct route is provided, the alternate route being used where the direct route is not available. Depending upon traffic arrangements provided for particular switching offices, there may be only direct routes or both direct and alternate routes.

One route relay is provided for each direct or alternate route trunk group including not more than 40 trunks. One route relay is provided for a trunk group arranged in two subgroups where each subgroup includes not more than 40 trunks. Where a trunk group is subdivided into three or more subgroups, each including not more than 40 trunks, two route relays are provided.

If only one route relay is provided for a destination route, that route relay is operated directly from the called office code translator. If two route relays are provided, one is a first choice and the other is a second choice; and, the first choice is operated directly from the code translator, with the second choice being operated under control of the first choice when the marker is not successful in establishing a connection over the first choice route due to an all-trunks-busy condition in that first choice route.

All route relays are arranged in five groups and circuits extending over contacts of the route relays (for various purposes including location of trunks for busy-idle searching et cetera) in each of the five groups are controlled by separate sets of ground supply relays.

The first and second route relay groups contain all route relays representing direct routes for which alternate routes are provided. The first group includes either first choice subgroups of trunks and/or the only first choice group of trunks when no subgrouping is provided. Contacts of the first group of route relays connect to terminal block 7000 (see FIGS. 11, 12 and 13 of the present drawing) and are under the control of relay in the first ground supply, including relays G1(M)7002(—) and TB1(M)7003(—). The second group includes second choice groups or subgroups for direct routes for which alternate routes are provided. Contacts of the second group of route relays connect to terminal block 7010 (see FIGS. 12 and 13) and are under the control of relays in the second ground supply, including relays G2(M)7012(—) and TB2(M)7013(—).

The third and fourth route relay groups contain all route relays representing all alternate routes. The third group involves either first choice subgroups and/or the only first choice groups of trunks where no subgrouping is provided. Contacts of the third group of route relays connect to terminal block 7100 (see FIGS. 11, 12 and 13) and are under the control of relays in the third ground supply, including relays G3(M)7102(—) and TB3(M)7103(—). The fourth group involves second choice groups or subgroups either for routes having no alternate route or for alternate routes. Contacts of the fourth group of route relays connect to terminal block 7110 and are under the control of relays in the fourth ground supply, including relays G4(M)7112(—) and TB4(M)7113(—).

The fifth group of route relays represents overflow and permanent signal trunk groups. Contacts of these route relays connect to terminal block 7120 (see FIGS. 12 and 13).

Up to a maximum of five route relays could be involved in an attempt to complete a particular connection, the following being the order of relay operations:

1. first ground supply — route relay of a first choice group or subgroup of a direct route;
2. second ground supply — route relay of a second choice group or subgroup of a direct route;
3. third ground supply — route relay of a first choice group or subgroup of an alternate route;
4. fourth ground supply — route relay of a second choice group or subgroup of an alternate route;
5. fifth ground supply — route relay of an overflow route.

Functions of Route Relays

The general functions of the route relays are:

1. control transmission of information to the sender so the sender can complete the connection over the indicated route;
2. cause connection to take place between the marker and the office frames containing the group or subgroup of trunks to be tested for availability;
3. cause the trunk testing relays of the marker to limit trunk testing to only those trunks (not more then 40 trunks at a time) assigned to the indicated route;
4. cause preparation to take place in the marker for alternate routing if the indicated route has an alternate;
5. prepare circuits for controlling certain of the traffic registers.

Call Assumptions

It is assumed, for purposes of the example of route relay control, that a call is placed for a destination having (1) a direct route consisting of two first choice subgroups of trunks, (2) an alternate route consisting of thirteen subgroups of trunks, twelve first choice subgroups and a thirteenth subgroup which is a second choice for each of the twelve first choice subgroups, and (3) an overflow route.

First Subgroup of First Choice Subgroup of Direct Route

This route calls for the operation from the code translator of only one route relay, such as route relay R—(M)7300(—) whose contacts are connected to terminal block 7000 (see FIGS. 11, 12 and 13 of the present drawing) and are controlled by relays of the first ground supply, including relays G1(M)7002(—) and TB1(M)7003(—).

Certain relay operations take place in the marker incident to control functions which take place at various times. Some of these relay operations are mentioned from time to time herein as they have a bearing on the significant description. Relays CK4(M)5104(—) and CK6(M)5106(—) are operated as part of the circuit operation in the marker which checks the proper operation of marker register relays for registering information from the sender regarding the called number, the calling circuit frame location, et cetera. Relays ST1(M)5400(—) and ST2(M)6000(—) are operated under the control of the operated relay CK6(M)5106(—) to provide off-normal ground for various parts of the marker. It will be assumed that the calling customer has been connected to district frame No. 9 (of the 10 possible frames) so that relay DF9(M)5002(—) will have been operated under the control of the operated relay ST1(M)5400(—) and of the unoperated relay ST4(M)5108(—).

Part of the circuitry for transmitting information to the sender for completion of the anticipated connection is shown in FIG. 15. Ground is provided over make contact R2 of relay CK6(M)5106(—) to lead 5146, thence over position 1 of switch S and through break contact L4 of relay TB(M)5107(17) to lead 5125 so that the transmitting relays of Carpenter can supply information over leads 4713 through 4742 to the sender. Relays XT(M)6717(15) and XT1(M)6718(15) are for detecting short circuits among the transmission leads or false ground conditions thereon: these relays will remain released under normal circumstances.

The route relay controls the connection of the marker to a pair of office frames containing the trunk groups represented by the route relay, identifies the location on those office frames of the proper trunks, and prepares the marker trunk testing circuitry to test those trunks in groups of up to 40 at a time. Contacts of route relays control such items as office frame selection, trunk group locations, and the start and end points for testing the trunks. Contact 7309 of route relay R—(M)7300(—) in FIG. 13 controls office frame selection, the only item of interest here at the moment.

As above assumed, two subgroups of direct route trunks are involved. These two subgroups of trunks may be at different locations on the same pair of office frames or at the same location on different pairs of frames. Relay GPOA(M)7500(—) is operated (among other relays) to steer the marker to the loction of one of the first choice subgroups; and, relay GP1A(M)7502(—) is operated with respect to the other one of the first choice subgroups. Since either of relays GPOA(M)7500(—) and GP1A(M)7502(—) may be operated depending on circuit conditions, it will be assume that relay GPOA(M)7500(—) is operated. Relay GP0A(M)7500(—) operates under the control of the operated relay CK4(M)5104(—) and of the released relays GT1(M)5109(17) and GZO(M)5201(—). Office link start battery is extended in FIG. 12 through resistor 5401, over make contact L3 of relay ST1(M)5400(—), lead 5402, break contacts R3 of relays TM7(M)5507(—) and TM9(M)5509(—), lead 5514, break contacts L4 and L3 of respective relays ST3(M)5403(—) and SDT(M)5405(—), lead 5406, thence over break contact L1 of relay G1(M)7002(—), lead 7023, cable 7050, lead 7023, break contact B2 of relay TWA(M)6714(—), lead 7018, cable 7050, lead 7018, terminal block 7000, lead 7018 into FIG. 13, thence over make contact 7309 of route relay R—(M)7300(—), lead 7313, a make contact of relay GPOA(M)7500 (—), lead 7735, position 1 of switch S, lead 7735(1) into FIG. 14, and to the office link start lead 7735(ST0) extending to the office link connector circuitry, the start lead STO representing the pair of office frames O(even frame) and 1(odd frame) whereon the first choice subgroup of trunks is located. The marker is arranged to test up to 40 trunks at one time, 20 on an even frame (0,2,4 et cetera) and 20 on an odd frame (1,3,5 et cetera) of a pair of frames.

Office frame connectors will be operated to connect the marker to the indicated trunks for testing. The connector operation is controlled by (among other circuit conditions) the released conditions of relays EL(M)6100(—) and ER(M)6102(—) for even frames and of relays OL(M)6101(—) and OR(M)6103(—) for odd frames. Office frame relay OO(M)7600(—) will be operated for frames 0 and 1 under the control of the operated relay ST1(M)5400(—). Relay TKE(M)6110(—) will have been operated under the control of the operated relay ST-(M)5400(—) and of the released relays KELO(M)6230(15), KER1(M)6232(15), KOLO(M)6231(15), and KOR1(M)6233(15). Also, relay JD(M)5720(—) will be operated incident to office frame seizure and prior to trunk testing.

After sufficient time to allow any trunk test relays to operate regarding busy trunks, relay PT(M)6111(—)

operates to control the trunk selection circuitry. If the first trunk in the subgroup is idle, a selection and locking relay, such as KELO(M)6230(15), is operated in a circuit extending from ground in FIG. 17, over make contact L1 of relay PT(M)6111(—), make contact L1 of relay TKE(M)6110(—) (switch S in position 1), lead 6128, make contact R5 of relay DF9(M)5002(—), lead 5004, break contact R2 of relay AR1(M)5801(—), lead 5803(AR1), through the trunk test relays of Carpenter FIGS. 62 and 63, over a circuit not shown to the right side of the winding (in FIG. 15) of relay KELO(M)6230(15), lead 6206, break contact L1 of relay BE1(M)5907(—), lead 5909, position 1 of switch S, lead 5909, and to battery over make contact R3 of relay ST2(M)6000(—). The operation of relay KELO(M)6230(15) selects the idle trunk and causes the release of relay TKE(M)6110(—) and the operation of relay EL(M)6100(—). If the first trunk is busy, relay KOLO(M)6231(15) is next and will operate if the second trunk is idle. If the second trunk is also busy, then successive trunks are tested until one is found idle or until all trunks are found busy.

It will be understood that relay AR1(M)5801(—) is released on first marker trials and is operated on second marker trials, thus merely to vary the entrance point in FIG. 17 (on leads 5803 and 5851) into the trunk test relays so as to alter the preference for trunk testing. It will be assumed for discussion purposes that relay AR1(M)5801(—) is released as in first marker trials.

If an idle trunk is found in the first subgroup, the marker releases from the other office frame of the pair. If relays EL(M)6100(—) and KELO(M)6230(15) are operated regarding the even frame (0) of the pair, part of the marker connection to the odd frame (1) is released, and vice versa. Also the marker connects to the district frame, according to the operated relay DF9(M)5002(—), by causing the operation of connector relay MCA(M)2626(—).

The marker, having connected to the office and district frames, having selected an idle trunk, and having transmitted information to the sender for control by the latter of the connection, can release from the sender. The sender release relay SR(M)5417(—) operates under the control of the operated relay 00(M)7600(—) and of the released relays TKE(M)6110(—), GT2(M)5110(17), and TB(M)5107(17). Relays ST1(M)5400(—) and ST2(M)6000(—) remain locked operated under the control of the operated relay SR(M)5417(—). Relay SR(M)5417(—), in operating, causes the operation of relay ST4(M)5108(—) and closes circuits for locking operated various marker relays which would otherwise release upon disconnection of the sender from the marker. One such circuit holds operated the marker preferance relay in the office link circuit by extending the office start battery on lead 5514 in FIG. 12 over make contact L3 of relay SR(M)5417(—) to lead 7604 into FIG. 14 and over make contact L2 of relay 00(M)7600(—) to the office link start lead STO.

The operated relay SR(M)5417(—) causes a release signal to be sent to the sender with the resulting release of the sender from the marker. The marker register relays release, along with route relay R—(M)7300(—) and relays CK4(M)5104(—) and CK6(M)5106(—). The release of relay CK6(M)5106(—) causes the operation of relay ST3(M)5403(—), whhich causes the operation of relay ST5(M)5404(—). With relays ST3(M)5403(—) and ST5(M)5404(—) operated, the marker is free to be seized by another sender for use of the marker registering and decoding operations and up to the point of operating a route relay, even though the marker may still be engaged in setting up the connection between the district frame and the selected trunk for the first call.

Among the various circuit operations attending marker completion of the district frame-to-trunk connection is the operation of the district link frame relay JC(DF)2610(16) for initiating office junctor testing. This circuit extends from ground in FIG. 16, over break contacts R1 of relays BE1(M)5907(—) and BO1(M)5908(—), lead 6208, position 1 of switch S, lead 6208, make contact R1 of relay EL(M)6100(—), break contact R1 of relay ER(M)6102(—), lead 6132 (EVEN), make contact R1 of relay 00(M)7600(—), lead 2659, a make contact of connector MCA(M)2626(—), to battery through the winding of relay JC(DF)2610(16). When the connection has been set up and tested, the marker releases, thereby causing the release of its relays including ST1(M)5400(—), ST2(M)6000(—), ST3(M)5403(—), SR(M)5417(—), ST4(M)5108(—), JD(M)5720(—), DF9(M)5002(—), MCA(M)2626(—), 00(M)7600(—), KELO(M)6230(15), EL(M)6100(—), and ST5(M)5404(—). Also, the office frame connection is released and the district frame relay JC(DF)2610(16) is released. Following the release of the marker, the sender proceeds to complete the connection.

Second Subgroup of First Choice Subgroup of Direct Route

If the marker finds all trunks busy in the first subgroup of the direct route (instead of finding an idle trunk as above assumed) corresponding to the operated grouping relay GPOA(M)7500(—) and the operated route relay R-(M)7300(—), the marker proceeds to test the trunks of the second subgroup of the direct route. With relays GPOA(M)7500(—) and PT(M)6111(—) operated, the ground on lead 5803 in FIG. 17 will not cause the operation of a trunk select relay (as above assumed) but will extend in FIG. 17 to lead 6307 since all trunks will be found busy. Ground on lead 6307 extends over position 1 of switch S, and over break contact R3 of relays BE1(M)5907(—) and BO1(M)5908(—) to the armature (swinger) R1 of relay GT1(M)5109(17), which will have been operated (during the process of transmitting information to the sender) under the conrol of the operated route relay R-(M)7300(—) and of the released relays GZO(M)5201(—), G1(M)7002(—), and TB(M)5107(17). Ground on lead 5920 thus extends over make contact R1 of relay GT1(M)5109(17) to battery through the winding of relay GT2(M)5100(17), which operates and locks over its make contact L2 to the locking ground for relay GT1(M)5109(17) on lead 5141. Relay GT2(M)5100(17) also locks over break contact L1 of relay GT3(M)5111(17). The operation of relay GT2(M)5100(17) causes the release of relay GPOA(M)7500(—) to open the start lead 7735(STO) in FIGS. 13 and 14, thus releasing the office frame and district frame circuits. This is followed by the release of relay PT(M)6111(—), which causes the operation of relay GT3(M)5111(17) from ground in FIG. 17, over break contact L1 of relay PT(M)6111(—), lead 5142, make contacts L1 and R1 of respective relays GT1(M)5109(17) and GT2(M)5110(17), lead 5160, to battery through the winding of relay GT3(M)5111(17). The operation of relay GT3(M)5111(17) causes the operation of relay GZO(M)5201(—), which causes the release of relay GT1(M)5109(17). The operation of relay GT3(M)5111(17) also causes the release of relay GT2(M)5110(17), which causes the operation of grouping relay GP1A(M)7502(—). When relay GP1A(M)7502(—) operates, the resistance battery on lead 7313 in FIG. 13 from make contact 7309 of the operated route relay R—(M)7300(—) is extended over a make contact of relay GP1A(M)7502(—) to lead 7507, position 1 of switch S, lead 7507(1) to FIG. 14, and to an office start lead (such as one of the leads STO, ST2, ST4, ST6 and ST8 into the office link connector) for the pair of frames containing the second trunk subgroup. The marker operates as before to search for and test the busy-idle status of the trunks either to find and seize an idle trunk or to find all trunks busy.

First Choice Subgroup of Alternate Route

If the marker finds all trunks busy in the second subgroup of the direct route corresponding to the operated route relay R—(M)7300(—) and the operated grouping relay GP1A(M)7502(—), it will be necessary for the marker to search among trunks in an alternate route, the first such trunks being in the first choice subgroup of alternate route trunks. This will involve the operation of the additional alternate route relay R—(M)7200(—).

When relay PT(M)6111(—) reoperates after a delay to allow any trunk test relays to operate, the previously described circuit in FIG. 17 will extend ground to lead 5803 as before. Since all trunks in the searched group are bush, the trunk test relays will extend the ground to lead 6307 as before to the swinger armature R1 of relay GT1(M)5109(17), which being released will extend the ground on lead 5920 through break contact R1 of relay GT1(M)5109(17) to battery through the winding of the trunks-busy relay TB(M)5107(17), which therefore operates. Relay TB(M)5107(17), in operating, causes the release of relay GT3(M)5111(17) and locks itself operated (so that another office link will not be asked for until the district link has released) in a circuit extending from the right side of the winding of relay TB(M)5107(17), position 1 of switch S, make contact L1 of relay TB(M)5107(17), lead 5136, break contact R2 of relay RL(M)5415(18), lead 2635, and to ground in the district frame connector over a make contact of the operated connector relay MCA(M)2626(—).

In FIG. 15, the operation of relay TB(M)5107(17) opens at its break contact L4 the ground supply on lead 5125 to the transmitting relays, thus causing the release of all of the associated register relays of the sender.

Also, the operation of relay TB(M)5107(17), with relay G1(M)7002(—) released and relay R-(M)7300(—) operated, causes the operation of relay TB1(M)7003(—), which in turn causes the operation of relay G1(M)7002(—).

Figure 12:
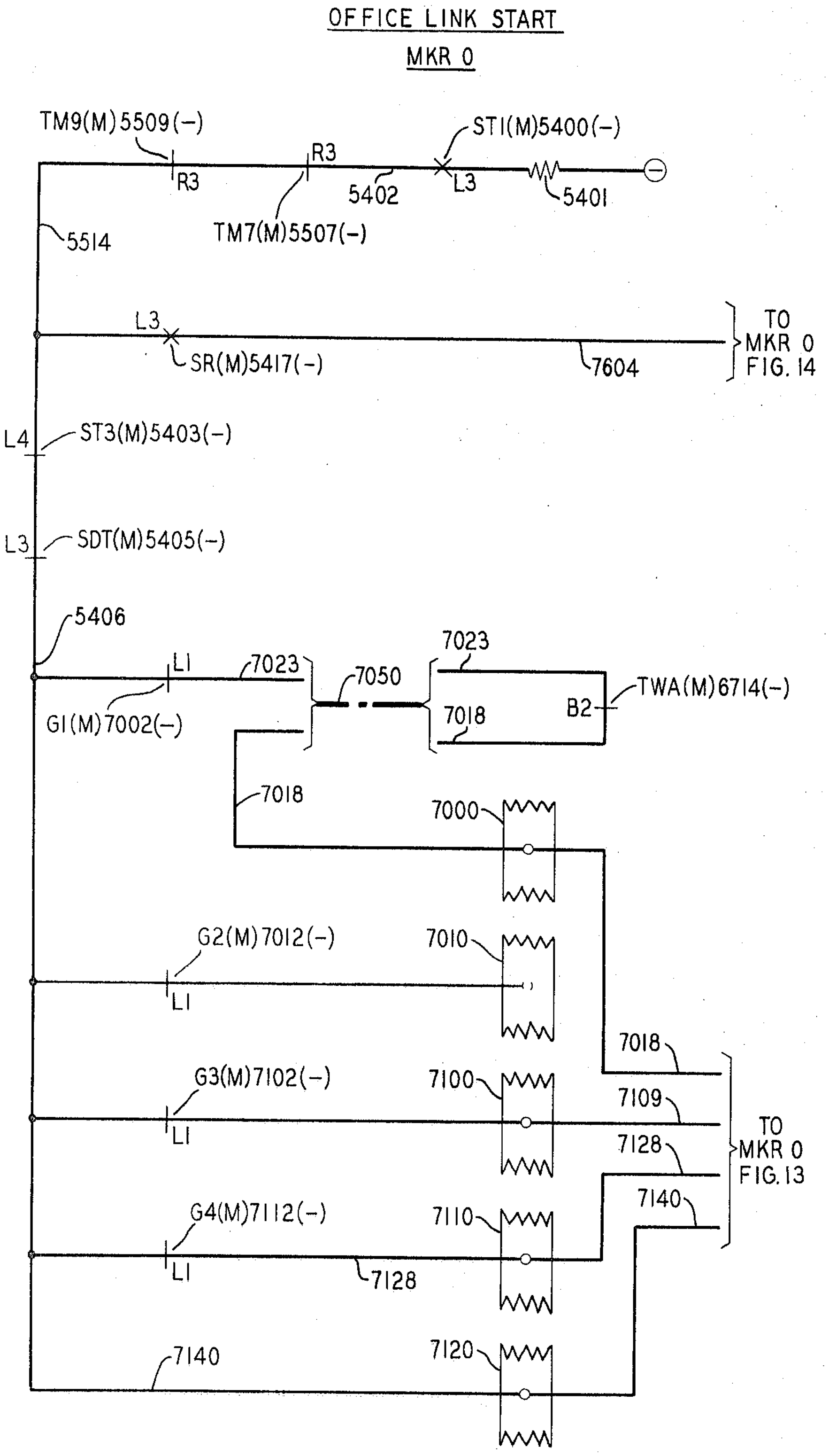
Figure 14:
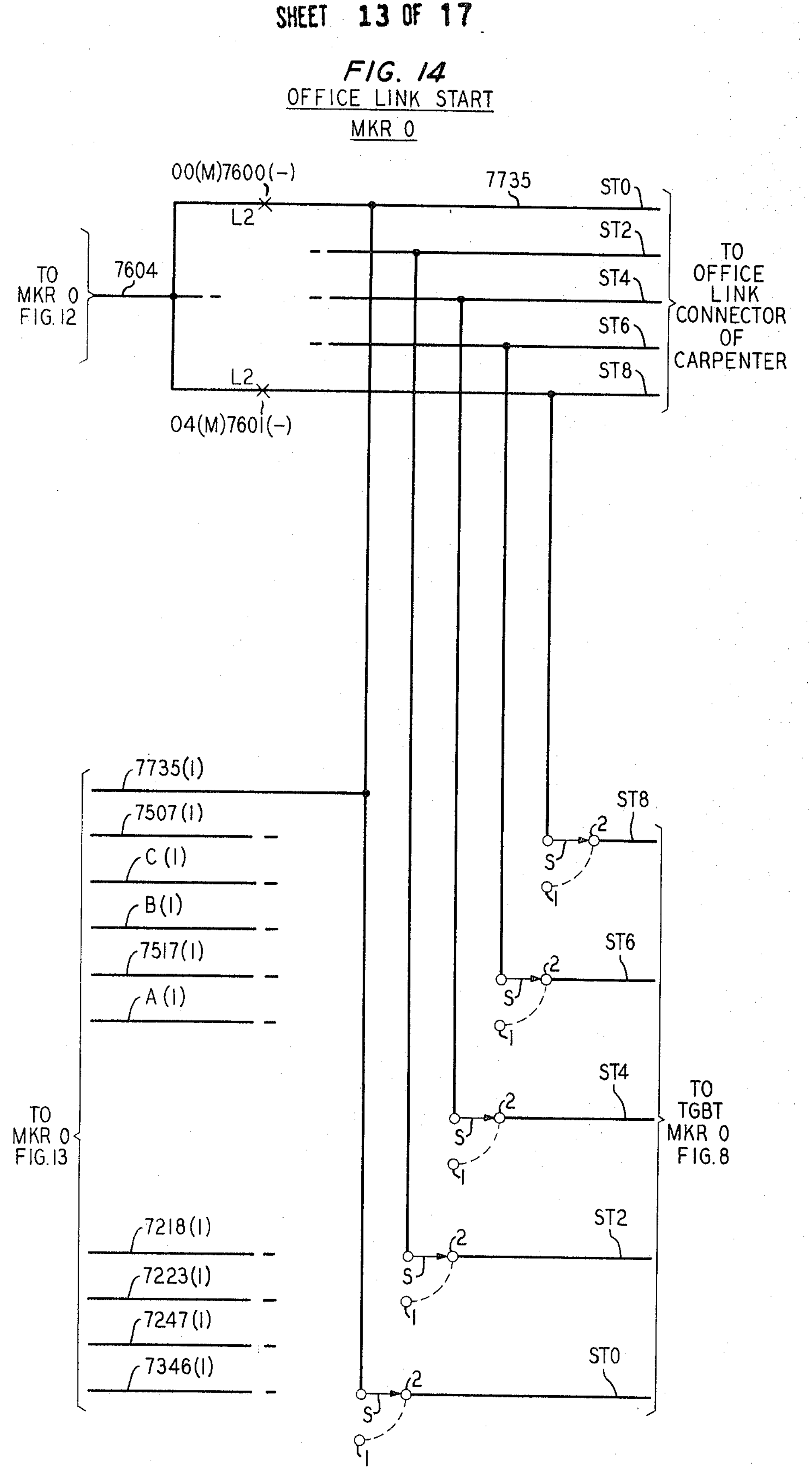

In FIGS. 12 and 13, the operation of ground supply relay G1(M)7002(—) removes battery from lead 7018 from FIG. 12 into FIG. 13, thus removing battery from the office link start lead (STO to ST8) in FIG. 14. This releases the office link circuitry, releases the office link relay 00(M)7600(—), and releases the district frame connections, resulting, among other things, in the release of relay PT(M)6111(—) and the release of relay TB(M)5107(17).

The release of relay TB(M)5107(17) releases relay TB1(M)7003(—), which causes the operation of the alternate route relay R—(M)7200(—) under the control of the released relay TB1(M)7003(—), the operated control relays CK6(M)5106(—) and G1(M)7002(—), and the operated original route relay R—(M)7300(—).

The alternate route relay R—(M)7200(—) represents 13 subgroups of alternate route trunks, each of 12 subgroups being successively first choice and the $13^{th}$ subgroup being second choice for each of the first 12 subgroups. Two route relays are required: R—(M)7200(—) for the first choice route and R—(M)7201(—) for the second choice route.

With regard to route relay R—(M)7200(—), 12 grouping relays GOA(M)7530(—) to G11A(M)7441(—) are provided. These relays are operated one at a time progressively, on successive calls to this route, so as to direct the marker to office frames containing such trunks. Thus, on any particular call to this route one of the relays GOA(M)7530(—) to G11A(M)7441(—) will be operated to specify one of the 12 subgroups as the first choice alternate route on that call. If it is assumed that relay GOA(M)7530(—) happens to be the one operated at the moment, office link start battery will extend from lead 5406 in FIG. 12, over break contact L1 of relay G3(M)7102(—), lead 7109 into FIG. 13, thence over make contact 7209 of relay R—(M)7200(—), lead 7213, a make contact of grouping relay GOA(M)7530(—), position 1 of switch S, lead 7517(1) into FIG. 14 and to the appropriate one of the office link start leads STO to ST8. If another grouping relay were operated instead of relay G0A(M)7530(—), such as relay G11A(M)7441(—), the lead 7213 would have extended over a make contact of relay G11A(M)7441(—), position 1 of switch S, and over lead A(1) into FIG. 14 to an appropriate one of the office link start leads ST0 to ST8, et cetera. The operation and release of relay CK6(M)5106(—) on successive calls is what causes the stepping of relays G0A(M)7530(—) through G11A(M)7441(—) for such successive calls so that different trunk subgroups successively become first choice alternate routes. Relay CK6(M)5106(—) controls relays GZ0(M)5201(—) and GW0(M)5200(—) in the usual W-Z arrangement, which controls other relays so as to step the grouping relays.

The marker tests the first choice alternate route trunk group corresponding to the operated one of the grouping relays G0A(M)7530(—) through G11A(M)7441(—) and effects a connection to a trunk, as above described, assuming that at least one of such trunks is idle.

Second Choice Subgroup of Alternate Route

In the event that the marker finds all trunks busy in the first choice subgroup of the alternate route, relay TB(M)5107(17) will operate to indicate the all-trunks-busy condition, as above described. With route relay R—(M)7200(—) operated and with ground supply relay G3(M)7102(—) released, the operation of relay TB(M)5107(17) causes the operation of rela TB3(M)7103(—) to in turn cause the operation of relay G3(M)7102(—), which opens the start lead (lead 7109 from FIG. 12) into FIG. 13 toward the office link connector start lead ST0 to ST8 of FIG. 14. This, as previously discussed, releases the office and district link circuitry and releases relay PT(M)6111(—), which in turn causes the release of relays TB(M)5107(17) and TB3(M)7103(—). With route relay R—(M)7200(—) operated, relay G3(M)7102(—) operated, relay CK6(M)5106(—) operated, and relay TB3(M)7103(—) released, route relay R—(M)7201(—) for the second choice subgroup is operated. A new office link start lead is now energized from resistance battery on lead 5406 in FIG. 12, over break contact L1 of relay G4(M)7112(—), lead 7128 into FIG. 13, thence over a make contact of route relay R—(M)7201(—), lead 7218, position 1 of switch S, lead 7218(1) into FIG. 14 to the appropriate one of the office link start leads ST0 to ST8, et cetera. The marker thereupon tests the trunks in the indicated group.

Overflow Route

If the marker finds an all-trunks-busy condition in the second choice subgroup of the alternate route, corresponding to the operated route relay R—(M)7201(—), the marker proceeds to test the overflow route for a final path. When the trunks-busy relay TB(M)5107(17) operates, with route relay R—(M)7201(—) operated and relay G4(M)7112(—) released, relay TB4(M)7113(—) is caused to operate, which in turn causes ground supply relay G4(M)7112(—) to operate to release the office link connector, et cetera. Eventually, as previously described, relay TB(M)5107(17) will releas to in turn cause the release of relay TB4(M)7113(—). The release of relay TB4(M)7113(—), with relays R—(M)7201(—) and G4(M)7112(—) and CK6(M)5106(—) operated, causes the operation of route relay R—(M)7202(—) representing the overflow route. In FIG. 12, the resistance battery on lead 5406 is now extended over lead 7140 into FIG. 13, thence over a make contact of relay R—(M)7202(—), lead 7223, position 1 of switch S, and lead 7223(1) into FIG. 14 to an appropriate one of the office link start leads ST0 to ST8. The marker then provides to test for an idle overflow trunk in the designated overflow subgroup of trunks, et cetera.

Trouble Release to Sender

If the marker fails to find an idle overflow trunk, corresponding to trunk subgroup testing under the control of the overflow route relay R—(M)7202(—), the marker will signal the sender for a trouble release. Under these circumstances, when relay TB(M)5107(17) operates to indicate an all-trunks-busy condition in the overflow route, the trouble release signal is sent to the sender under the control of the operated relays R—(M)7202(—) and CK6(M)5106(—) and of the released relays OF1(M)5626(—), TM7(M)5507(—), ST3(M)5403(—), and ST5(M)5404(—).

Traffic Register Operation

During the course of the above trunk searching operations, traffic registers may be operated to make a record of the number of times a particular trunk group is searched and the number of times an all-trunks-busy condition is found within such a group. Two traffic registers are provided for each of some trunk groups, a peg count (PC) register to record the number of calls routed to a trunk group and an overflow (OF) register for the number of calls routed to a trunk group when an all-trunks-busy condition is found.

These traffic registers are controlled by contacts of the appropriate route relays. As an example, when route relay R—(M)7300(—) is operated to cause trunk searching in both first choice subgroups of direct route trunks, according to the previous discussion, FIG. 11 shows how the corresponding traffic registers PC(TR)7349(11) and OF(TR)7350(11) are controlled in the traffic register circuit common to the markers.

When the trunk group trunk testing is to take place register PC(TR)7349(11) is operated in a circuit extending from ground in FIG. 11, over make contact L4 of relay CK6(M)5106(—), break contact R1 of relay ST4(M)5108(—), lead 5744 (position 1 of switch S), make contact L2 of relay JD(M)5720(—), lead 5329, break contact L2 of relay DMT(M)5318(—), lead 7028, break contact L2 of relay TB1(M)7003(—), break contact R2 of relay G1(M)7002(—), lead 7019, make contact R12 of route relay R—(M)7300(—), to battery through the winding of peg count register PC(TR)7349(11).

If an all-trunks-busy condition is found in the trunk group (that is, both subgroups) tested, relay TB(M)5107(17) operates to cause the operation of relay TB1(M)7003(—) as previously described. The operation of relay TB1(M)7003(—) shifts the ground on lead 7028 in FIG. 11, over make contact L2 of relay TB1(M)7003(—), to lead 7020, through make contact R13 of route relay R—(M)7300(—), over position 1 of switch S, to battery through the winding of the overflow register OF(TR)7350(11).

If more than one route relay is involved in a trunk group testing operation involving a first choice and a second choice route, the peg count register is controlled by contacts of the route relay for the first choice route, and the overflow register, if provided, is controlled by contacts of the route relay for the second choice route since the entire trunk group will not have been ascertaned as busy until both first and second choice subgroups have been searched.

As another example, when route relay R—(M)7200(—) is operated to cause trunk searching in a first choice subgroup of alternate route trunks, according to the previous description, FIG. 11 shows how the corresponding traffic register PC(TR)7248(11) is controlled in the traffic register circuit. When the trunk group testing is to take place, register PC(TR)7248(11) is operated in a circuit extending from ground on lead 7028 in FIG. 11, thence over lead 7141, break contact L2 of relay TB3(M)7103(—), break contact R2 of relay G3(M)7102(—), terminal block 7100, make contact R12 of route relay R—(M)7200(—), to battery through the winding of register PC(TR)7248(11).

If an all-trunks-busy condition is found in the first choice trunk subgroup tested, relay TB(M)5107(17) operates to cause the operation of relay TB3(M)7103(—) as previously described. The operation of relay TB3(M)7103(—) shifts the ground on lead 7141 in FIG. 11, over make contact L2 of relay TB3(M)7103(—), terminal block 7100, and through make contact R13 of route relay R—(M)7200(—) to the switch S. With switch S in its position 1, no connection is extended to cause the operation of an overflow register similar to OF(TR)7350(11) since another route relay operation, such as R—(M)7201(—) according to previous description, must take place for trunk searching in the second choice subgroup of the alternate route before it can be ascertained, if at all, that both of the first and second choice trunk groups are busy. That next route relay R—(M)7201(—) will control the operation of a suitable overflow register (if provided) if both of those first and second choice subgroups of the alternate route are found to be busy.

Switch S-Position 2

Position 1 of switch S, as above described, shows how the circuitry of the prior art functions to cause a marker to successively connect to and search successive groups of trunks for an idle trunk for the route indicated. When switch S is placed in its position 2, the prior art circuitry is modified according to an embodiment of the present invention to enable a marker to skip busy trunk groups.

Group Busy Timers

It is assumed, for purposes of the exemplary disclosure, that 60 trunk groups or subgroups are involved and are designated groups 00 through 59 and that these 60 groups are divided into four equal parts, each part being associated with one of the four timers TM1 through TM4 of FIG. 6. Each timer is controlled by a separate one of the relays ST1(5) through ST4(5) of FIG. 5; and, each of the relays ST1(5) through ST4(5) is controlled by a separate plurality of 15 trunk groups. Relay ST1(5) is controlled by trunk groups 00 to 14, relay ST2(5) is controlled by trunk groups 15 to 29, relay ST3(5) is controlled by trunk groups 30 to 44, and relay ST4(5) is controlled by trunk groups 45 to 59.

As will be explained, when a marker finds a busy trunk group (or subgroup where appropriate) during a normal searching operation, an indication of the busy condition is registered in the group busy circuit of FIGS. 2 through 6, and the associated relay ST1(5) through ST4(5) is operated to energize the corresponding timer TM1 through TM4 of FIG. 6. The registration is held until the associated timer times-out, at which time all trunk-group-busy indications controlled by that timer are released or deleted.

The internal operation of timer TM1 of FIG. 6 is now described so that the details therof need not interrupt subsequent description of the busy-trunk-group skipping circuit functions. Referring to FIG. 6, and particularly to timer TM1 (timers TM2 through TM4 are identically arranged), with relay ST1(5) released timer TM1 is normal with relay TM1(6) released. Capacitors C and CA1 are charged to minus 48 volts at terminal 1 of the timer in a circuit extending from battery, over break contact 2 of relay ST1(5), terminal 1, through capacitors C and CA1 in parallel to terminal 2, thence over break contact 3 of relay ST1(5) to ground through resistor RE1. Transistors Q1, Q2 and Q3 are turned off. When relay ST1(5) is operated, terminal 2 is driven to about minus 48 volts over make contact 2 of relay ST1(5), which drives terminal 1 to about minus 96 volts. The charge on capacitors C and CA1 start discharging in a circuit extending to ground through resistor RA1. When terminal 1 reaches about minus 46 volts, transistor Q1 will turn on to cause transistor Q2 to turn on, which in turn causes transistor Q3 to turn on to cause relay TM1(6) to operate. As long as relay ST1(5) remains operated, the timer TM1 remains energized with relay TM1(6) remaining operated. When relay ST1(5) releases, terminal 1 is reset to about minus 48 volts over break contact 2 of relay ST1(5) to turn off transistors Q1, Q2 and Q3, thus to release relay TM1(6). Also, capacitors C and CA1 quickly recharge through resistor RE1. The time-out interval of timer TM1 is the duration of time from the operation of relay ST1(5) until transistor Q3 turns on to operate relay TM1(6). This time interval is controlled by the value of the capacity (capacitors C and CA1 added in parallel) and resistance (resistor RA1) in the discharge path. The values of capacitor CA1 and resistor RA1 can be chosen to effect a time-out interval as desired. In the present circuitry the time-out intervals of timers TM1 through TM4 are suggested to be from one to ten seconds depending on the traffic situation for the trunk groups associated with the timers. The four time-out intervals may be the same or different as desired; and, of course time-out intervals other than from one to ten seconds may be used.

Group Busy Registration

In the traffic register arrangement of FIG. 11, which is common to all markers, with switch S in position 2 the overflow register OF(TR)7350(11) is controlled differently than in the prior art. Operating ground on lead 7020 from make contact L2 of relay TB1(M)7003(—), which operates when all trunks in the route are busy, extends over make contact R13 of route relay R—(M)7300(—) and position 2 of switch 3 to an overflow terminal block OF(M) of the marker, thence by cross-connection to a traffic register terminal block TR(M) of the marker, which is paralleled with leads from the other marker terminal blocks TR(M), not shown, to a traffic register terminal block TR(TR) in the traffic register circuit. In the traffic register circuit, the terminal block TR(TR) is cross-connected to another terminal block E(TR) having a terminal for each of sixty relays EOO(TR)(11) through E59(TR)(11) corresponding to sixty trunk groups. Of course, it will be appreciated that more than sixty relays E— can be used depending upon the amount and flexibility of control desired. In the example shown, the ground from make contact R13 of route relay R—(M)7300(—) extends to the E(TR) terminal for relay EOO(TR)(11) and extends through the winding of relay EOO(TR)(11) and through position 2 of switch S to battery. Relay EOO(TR)(11) operates and locks to ground over its make contact 2 and break contact 1 of the overflow register OF(TR)7350(11). This locking circuit insures that relay EOO(TR)(11) does not release too quickly in the event that the operating ground is removed promptly from lead 7020 as the marker performs its route advance function. The operation of relay EOO(TR)(11) completes an obvious circuit over its make contact 1 and position 2 of switch S to cause the operation of register OF(TR)7350(11), the operation of which causes relay EOO(TR)(11) to release, to in turn release the register OF(TR)7350(11).

The momentary operation of relay EOO(TR)(11) momentarily closes, at its make contact 3, the loop between leads OFOO and OFGOO into FIG. 2 to cause registration of the busy indication for both first choice subgroups of the entire trunk group tested. It will be understood that any of the relays EOO(TR)(11) through E59(TR)(11) may cause the same effect with regard to their corresponding pairs of leads, such as leads OF59 and OFG59 for relay E59(TR)(11), into the circuitry of FIGS. 2 and 3. Of course, the assignment of contacts of the E— relays may be as flexible as desired as to controlling the GB— relays of FIGS. 2 and 3.

Figure 3:
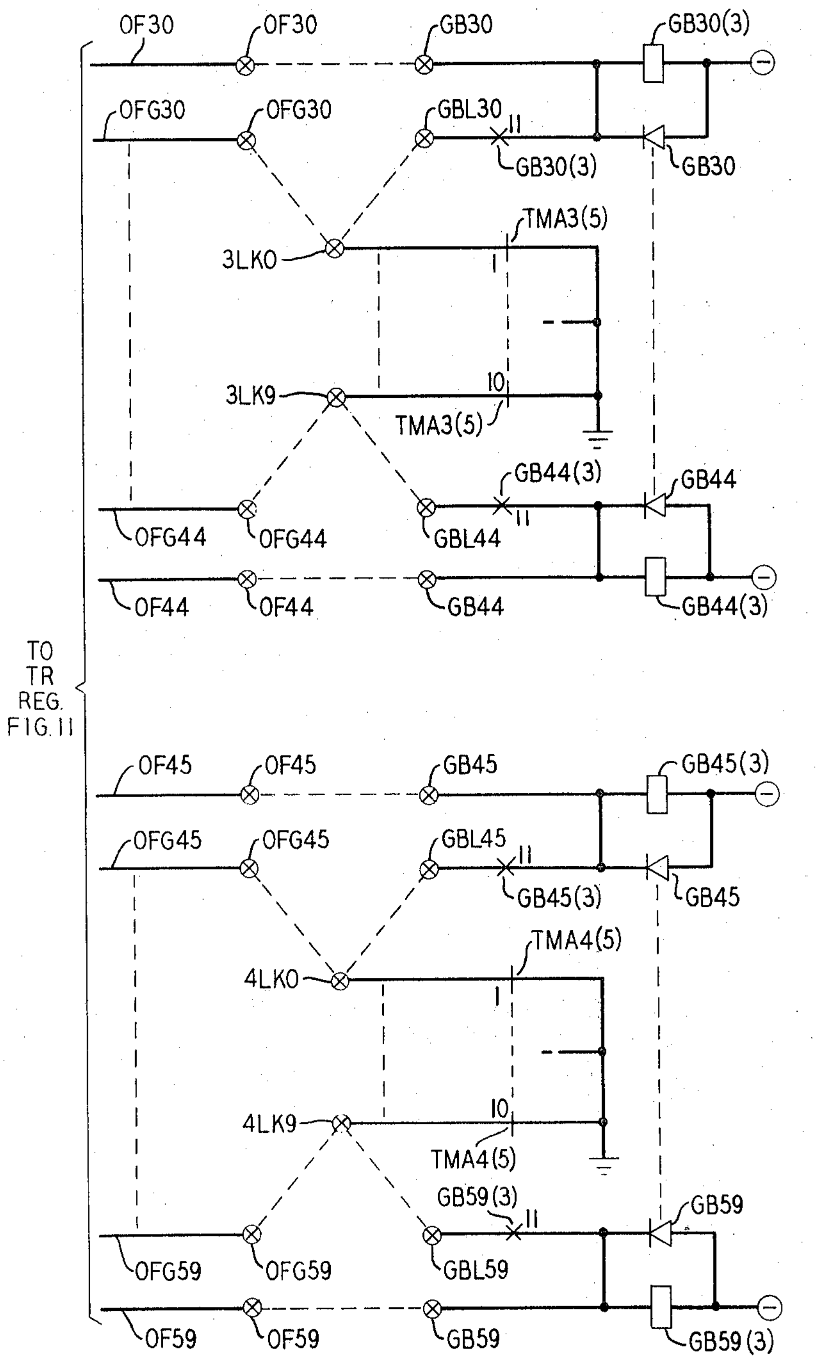
Figure 4:
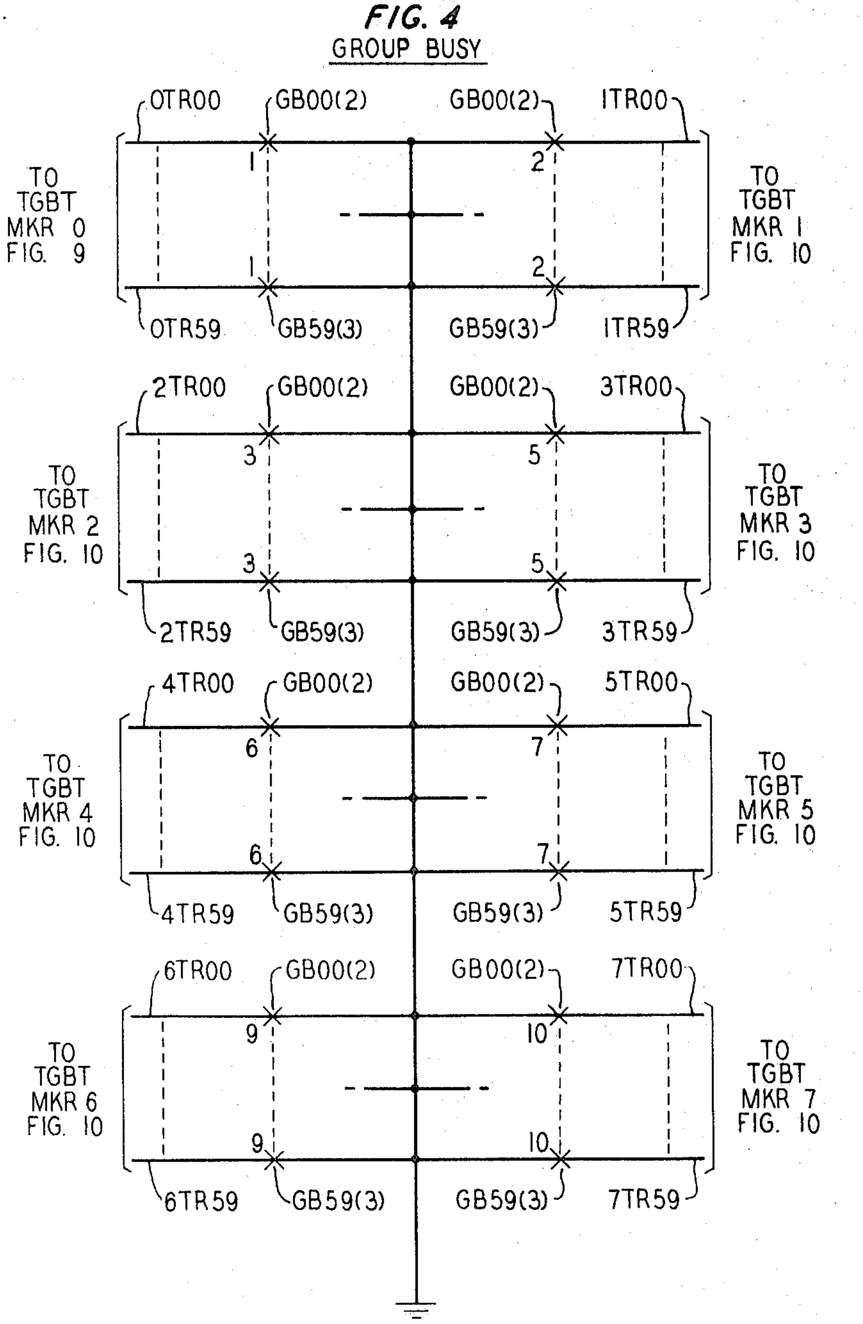

In FIG. 11, regarding the first choice subgroup of trunks for the alternate route with route relay R—(M)7200(—) operated, no overflow traffic register is operated if all trunks in that subgroup are busy; but, a relay such as E58(TR)(11) or E59(TR)(11) is momentarily operated in order to record the trunk group busy condition in the group busy circuit of FIG. 3. These relays E58(TR)(11) and E59(TR)(11) could be arranged, if desired, to work with overflow registers as in the case of relay E00(TR)(11). The circuit of interest extends from ground at terminal block 7100 in FIG. 11, over make contact R13 of route relay R—(M)7200(—), thence over position 2 of switch S, and over make contact L1 of the operated one of the twelve grouping relays GOA(M)7530(—) to G11A(M)7441(—) to one of the punchings on the marker punching block GP(M), which is in multiple to similar circuitry in the other seven markers. The terminals of the GP(M) punching block are suitably connected to punchings on the traffic register punching block GP(TR) and from there to the E(TR) punching block for assignment to certain E— relays of FIG. 11. Assuming that grouping relay G0A(M)7530(—) is operated according to previous description, relay E59(TR)(11) would be operated for a moment until the release of relay TB3(M)7103(—) during the marker route advance. The momentary operation of relay E59(TR)(11) would cause the operating and locking of group busy relay GB59(3) in FIG. 3. Thus, a record is made of the busy condition of that single first choice subgroup of the alternate route. At such time as the second choice subgroup of the alternate route might be found busy, the then operated route relay, such as R—(M)7201(—), would cause the momentary operation of a relay E— of FIG. 11, along with the operation of an overflow register if desired, such as the arrangement in FIG. 11 of relay E00(TR)(11) and overflow register OF(TR)7350(11).

It is assumed that timer TM1 of FIG. 6 is normal or deactivated with relays ST1(5) and TM1(6) released and that relay TMA1(5) is also released. Relay GB00(2) operates from the momentary operation of relay E00(TR)(11) in a circuit extending from ground in FIG. 2, over break contact 1 of relay TMA1(5), terminal 1LK0, cross-connection to terminal OFG00, lead OFG00 into FIG. 11, over make contact 3 of relay E00(TR)(11), lead OF00 to FIG. 2, terminal OF00, cross-connection to terminal GB00, and to battery through the winding of relay GB00(2), which operates and locks over its make contact 11, terminal GBL00, cross-connection to terminal 1LK0, and to ground over break contact 1 of relay TMA1(5). As will be apparent from the cross-connections in FIG. 2, relay GB01(2) is operated and locked in parallel with relay GB00(2). The paralleling of relays GB00(2) and GB01(2) is necessary, in the particular illustration, in order that the group busy circuit may contain an indication that both of the first choice subgroups are busy since relays E00(TR)(11) of the traffic register of FIG. 11 could not have been operated unless such were true. Relay GB00(2) may be assigned to the second subgroup of the first choice subgroups and relay GB01(2) may be assigned to the first subgroup, all in the context, as assumed, that the first choice group of trunks of the direct route is divided into two subgroups. It will, of course, be appreciated that if an idle trunk were found in the second such subgroup (assuming the first subgroup to have been busy), there would never be any operation of relay E00(TR)(11) and thus no indication of a busy condition in the first subgroup regarding relay GB01(2). This is a calculated penalty in exchange for the advantages of the use of the invention. In this situation, relay E01 (not shown in FIG. 11) would be unassigned to relay GB01(2) but could, of course, be assigned to some relay other than relays GB00(2) and GB01(2).

Figure 5:
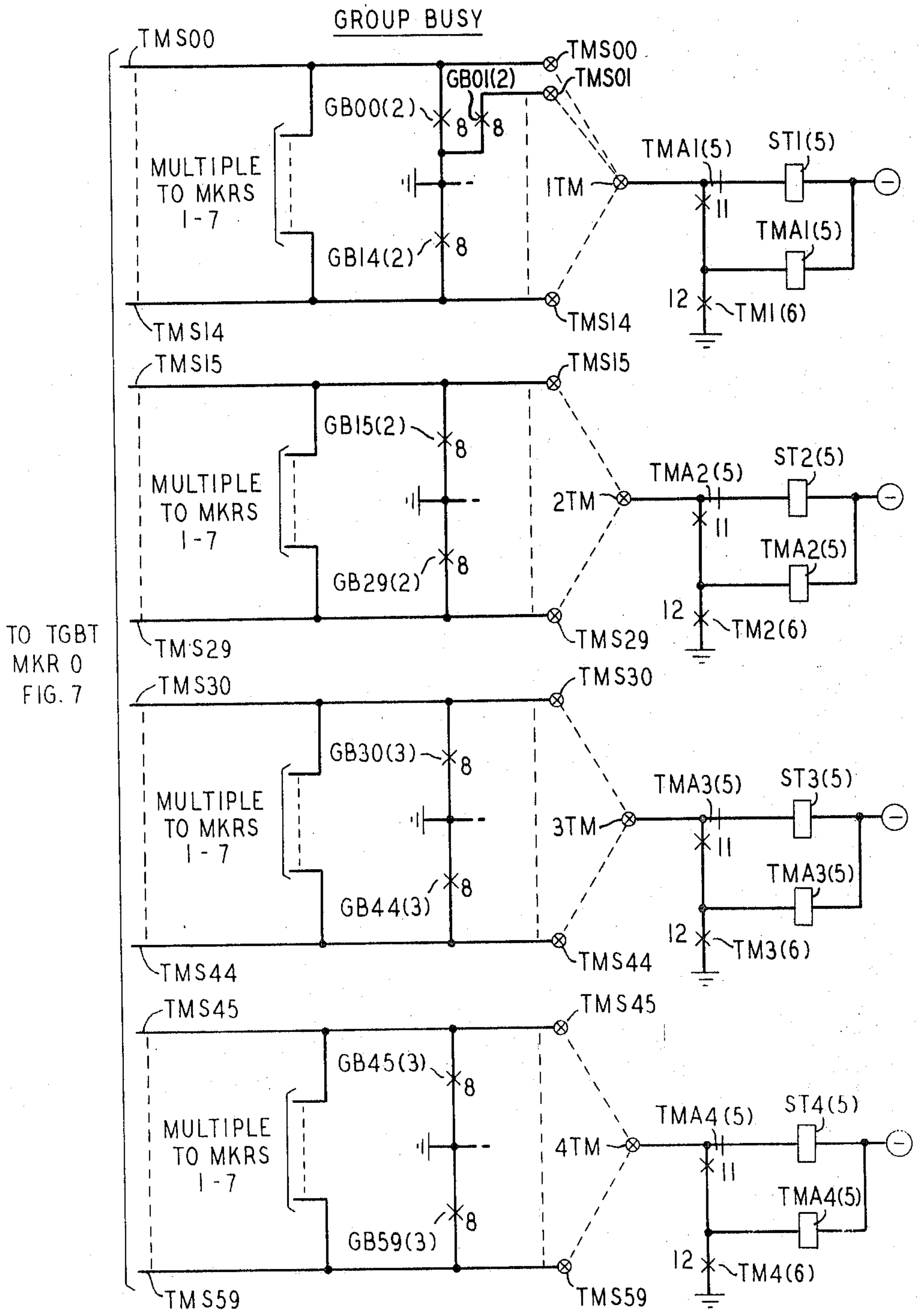

In FIG. 5, the operation of relays GB00(2) and GB01(2) causes the opertion of relay ST1(5) in a parallel circuit extending from ground, over make contacts 8 of relays GB00(2) and GB01(2), terminals TMS00 and TMS01, cross-connections to terminal 1TM, break contact 11 of relay TMA1(5), to battery through the winding of relay ST1(5). As previously explained, the operation of relay ST1(5) starts the time-out interval of timer TM1 of FIG. 6; and, relay TM1(6) will not operate until the end of the time-out interval of timer TM1. Until relay TM1(6) operates, relay TM1A(5) will remain released.

As long as relay TMA1(5) remains released (which will be until timer TM1 of FIG. 6 times-out), relays GB00(2) and GB01(2) will remain locked to ground under the control in FIG. 2 of break contact 1 of the released relay TMA1(5). Until timer TM1 of FIG. 6 times-out, it will be appreciated that any other busy trunk group indication from any marker may be registered by the operation in FIG. 2 of the corresponding relay GB02 (not shown) through GB14(2), and that any such operated relay will remain locked operated under the control of the released relay TMA1(5). The other three groups of register relays of FIGS. 2 and 3 function in a similar manner under the control of the other three timers TM2 through TM4 of FIG. 6.

It will be understood that the connections in FIG. 11 from route relay contacts to relays E00(TR)(11) through E59(TR)(11) by way of terminal blocks GP(M), GP(TR), OF(M), TR(M), TR(TR) and E(TR) are quite flexible so that any relay E00(TR)(11) through E59(TR)(11) can be made to operate momentarily for any desired trunk-group-busy condition. Also, the assignment of make contacts of relays E00(TR)(11) through E59(TR)(11) to the looped leads OF00 through OF59 and OFG00 through OFG59 into FIGS. 2 and 3 is quite flexible to enable particular jobs to be wired in accordance with individual requirements.

Transfer Relay Operation

Figure 7:
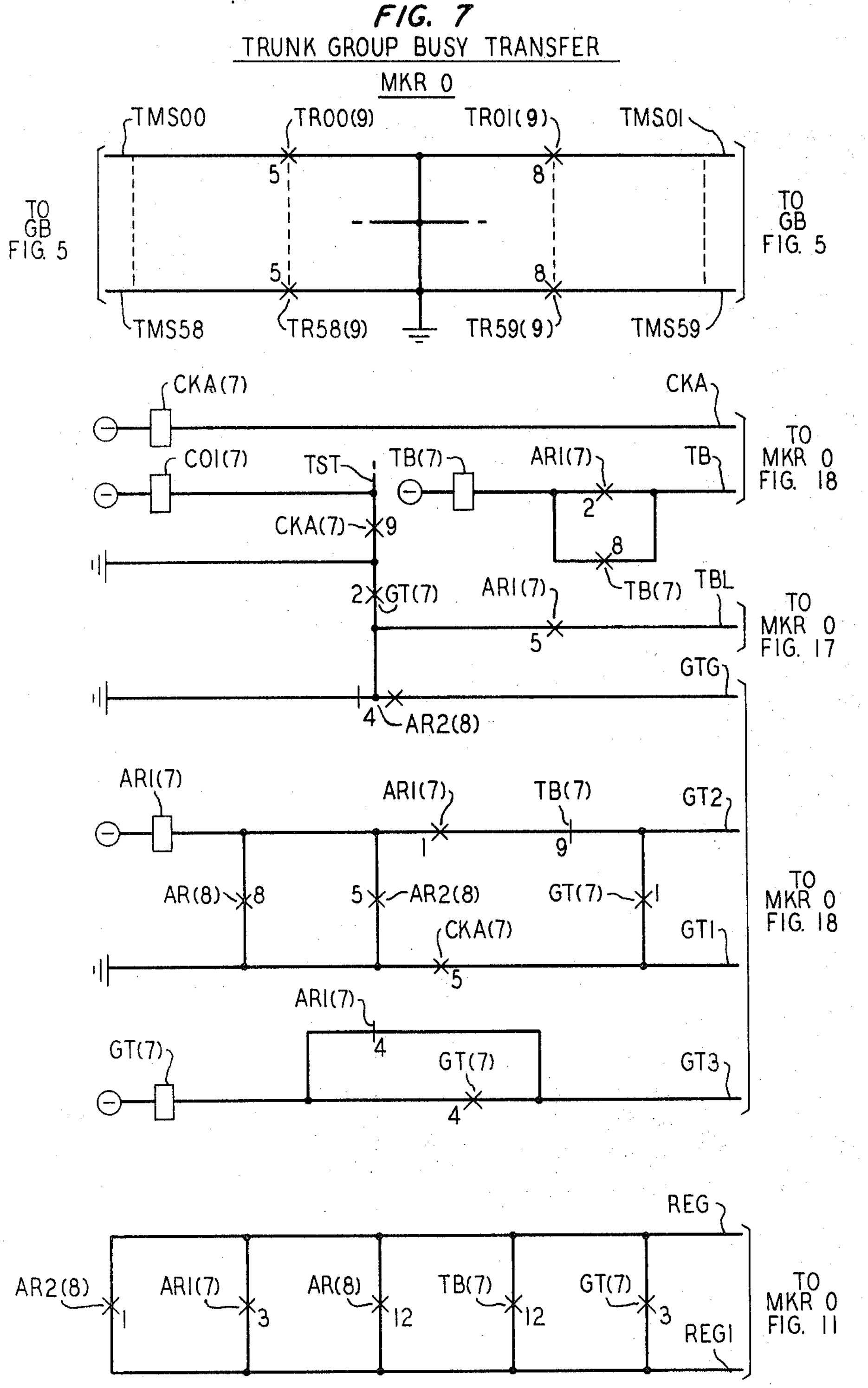
FIGS. 7 through 9 show for marker 0 the addition of the trunk group busy transfer circuitry shown in FIG. 1 as a dotted box.

Upon the operation of the group busy relays GB00(2) and GB01(2), circuits are completed for operating corresponding transfer relays in each marker. For instance, transfer relay TR00(9) of marker 0 in FIG. 9 is operated in a circuit extending from ground in FIG. 4, over make contact 1 of relay GB00(2), lead OTR00 into FIG. 9, over break contact 1 of cut-off relay C01(7), to battery through the winding of relay TR00(9). It will be noted in FIG. 4 that make contacts 2, 3, 5, 6, 7, 9 and 10 of relay GB00(2) apply ground to respective leads 1TR00 through 7TR00 extending to respective markers 1 through 7 to cause the operation in those markers of their corresponding transfer relays TR00. Relay TR01(9) in marker 0, and similar relays in the other markers, would be operated over similar circuits controlled by the additionally operated relay GB01(2). In FIG. 7 for marker 0, the operation of relay TR00(9) applies ground over its make contact 5 to lead TMS00 into FIG. 5 to maintain grounded the terminal 1TM. Each of the other six markers has a similar lead in FIG. 5 paralleled to lead TMS00 from marker 0 so that any of the seven markers having their transfer relays TR00 operated will maintain ground on terminal 1TM in FIG. 5. Likewise, the operation of relay TR01(9) will apply an additional ground on lead TMS01 from FIG. 7 into FIG. 5 and to the other markers.

Group Busy Time-Out

If any one of the timers of FIG. 6 should time-out so as to cause the operation of its relay TM1(6) through TM4(6), all of the operated group busy relays of FIGS. 2 and 3 controlled by that timer will be released. For instance, if timer TM1 of FIG. 6 times-out to cause relay TM1(6) to operate, then in FIG. 5 relay TMA1(5) operates in an obvious circuit under the control of make contact 12 of relay TM1(6). In FIG. 2, the operation of relay TMA1(5) opens at its break contacts 1, 10, et cetera, the operating circuits for relays GB00(2) through GB14(2), all of the operated ones of which, including relays GB00(2) and GB01(2), will release and cannot reoperate unless and until relay TMA1(5) releases. Upon the release of relays GB00(2) and GB01(2), ground is removed in FIG. 4 from all of the leads OTR00, 1TR00, et cetera to 7TR00 (and leads OTR01 through 7TR01) to the seven marker circuits, to cause the release therein of all of the marker TR00 and TR01 relays, such as relays TR00(9) and TR01(9) in FIG. 9 for marker 0, except those which may be locked operated in the marker, as will be discussed.

In FIG. 5, upon the operation of relay TMA1(5), that relay locks over its make contact 11 to ground over make contacts 8 of relays GB00(2) and GB01(2) until the latter relays release. The operation of relay TMA1(5) releases relay ST1(5) to recycle timer TM1 of FIG. 6 and to release relay TM1(6). When relays GB00(2) and GB01(2) release, as above discussed, relay TMA1(5) of FIG. 5 will remain locked operated from ground on any lead TMS00 or TMS01 in FIG. 5 from any marker having its relay TROO or TR01 locked operated. For instance, if relay TR00(9) is locked oeprated, as will be discussed, ground will extend from FIG. 7, over make contact 5 of relay TR00(9), over lead TMS00 into FIG. 5, and to the winding of relay TMA1(5). Similar grounds from any similarly locked operated relays TR00 in other markers will also appear on lead TMS00 in FIG. 5. This is to guarantee that a marker in the process of going through the trunks busy cycle, with its relay TR00 operated, will not reoperate the corresponding reay GB00(2) in the group busy circuit, this result being achieved by holding operated the relay TMA1(5). The same applies to relays TR01 and GB01. When relay TMA1(5) operates, upon a time-out of timer TM1 of FIG. 6, relay ST1(5) is released to normalize timer TM1; and, timer TM1 is not again energized until such time as relay ST1(5) is again operated, which in turn requires that relay TMA1(5) be in a released condition.

Summary of Group Busy Operation

With regard to the group busy circuitry of FIGS. 2 through 6, the following is a summary of circuit functions:

1. whenever timer TM1 of FIG. 6 is normal, with relays ST1(5) and TMA1(5) and TM1(6) released, any marker finding a busy trunk group associated with timer TM1 will cause the operation of the corresponding relay GB00(2) through GB14(2);
2. the first one of relays GB00(2) through GB14(2) to operated will operate relay ST1(5) to energize timer TM1;
3. at the end of the prescribed time-out interval of timer TM1, relays TM1(6) and TMA1(5) will operate;
4. the operation of relay TMA1(5) releases relay ST1(5) to normalize timer TM1 and release relay TM1(6);
5. the operation of relay TMA1(5) releases any operated relays GB00(2) through GB14(2);
6. the release of the operated ones of relays GB00(2) through GB14(2) opens all of the local locking circuits in FIG. 5 for relay TMA1(5);
7. relay TMA1(5) will release unless one or more locking grounds are still supplied to leads TMS00 through TMS14 into FIG. 5 from any of the markers, such as from FIG. 7 of marker 0;
8. none of the relays GB00(2) through GB14(2) can reoperate until relay TMA1(5) is released.

Summary of Relays TR00 through TR59

Each marker contains a relay TR00 through TR59 for each trunk group or subgroup controlled by the group busy circuit. FIG. 9 shows relays TR00(9) through TR59(9) for marker 0 (see FIG. 10 for markers 1 through 7). As will be explained below with regard to FIG. 9, before the marker has progressed in its circuit functions to the point of initiating its trunk searching operation, relay CKA(7) will be released and cut-off relay C01(7) will be released. Circuits extend from the relays TR00(9) through TR59(9) over leads OTR00 through OTR59 into FIG. 4 to make contacts 1 of relays GB00(2) through GB59(3) so that the operation of any such GB-relay of FIGS. 2 and 3 will cause the operation of the corresponding relay TR– in FIG. 9 of marker 0 (also, the TR-relays of the other markers). Also, the release of any such GB-relay will release the corresponding TR-relay. While any TR-relay of FIG. 9 is operated, a corresponding ground extends from FIG. 7 over a make contact 5 or 8 of the TR-relay over a lead TMS00 through TMS59 into FIG. 5 to provide a locking ground for relays TMA1(5) through TMA4(5). At such time as the marker operates its relay CKA(7), which in turn operates the marker cut-off relay C01(7), operated relays TR00(9) through TR59(9) are locked operated in FIG. 9 under the control of make contact 1 of relay CKA(7); and, no additional TR-relay may be operated in FIG. 9 due to the operated cut-off relay C01(7) having opened, at its break contacts, all of the operating leads OTR00 through OTR59 from FIG. 4.

Operation With No Pertinent Relay TR—(9) Operated

As previously discussed, when relay CK4(M)5104(—) operates in the marker incident to a check of proper operation in the marker of relays for registering information supplied from a sender, relay CKA(7) operates in a circuit from ground in FIG. 18, over make contact B3 of relay CK4(M)5104(—), position 2 of switch S, lead CKA into FIG. 7, and to battery through the winding of relay CKA(7). In FIG. 9, the operation of relay CKA(7) provides locking circuits over its make contact 1 for any operated relay TR00(9) through TR59(9) through the corresponding diode TR00 through TR59. In FIG. 7, the operation of relay CKA(7) causes the operation of cut-off relay C01(7) in an obvious circuit to ground over make contact 9 of relay CKA(7). In FIG. 9, the operated cut-off relay C01(7) opens, at its break contacts 1 through 60, the operating circuits of all of the relays TR00(9) through TR59(9) so that no such relays, not locked operated over make contact 1 of relay CKA(7), can operate until the marker releases from the sender when relay CKA(7) and cut-off relay C01(7) are released. Thus, on this marker seizure by a sender, the only relays TR0(9) through TR59(9) which will be operated are those locked operated under the control of the operated relay CKA(7).

In FIG. 7, none of the relays, except CKA(7) and C01(7), will be operated unless relay GT3(M)5111(17) of the marker is operated incident to attempting to initiate office frame seizure regarding a second subgroup of trunks in a trunk group subdivided into two subgroups, as previously described. If relay GT3(M)5111(17) is operated, then relay GT(7) is operated in a circuit extending from ground in FIG. 7, over make contact 5 of relay CKA(7), lead GT1 into FIG. 18, thence over make contact R2 of relay GT3(M)5111(17), lead GT3 into FIG. 7, thence over break contact 4 of relay AR1(7), to battery through the winding of relay GT(7), which operates and locks over its own make contact 4 to its operating ground on lead GT3.

In FIG. 11, if relay GT(7) is operated, as above described, the leads REG and REG1, in parallel over position 2 of switch S with make contact L2 of relay JD(M)5720(—), are connected together in FIG. 7 over make contact 3 of relay GT(7). This connection insures that peg count and overflow traffic registers, such as PC(TR)7349(11) and OF(TR)7350(11), can be properly operated if the marker never proceeds to office frame seizure, which must take place before relay JD(M)5720(—) can be operated. Such office frame seizure will not take place if, as will be discussed, the marker is caused to perform a trunks-busy cycle to route advance under control of relays TR00(9) through TR59(9) so as to skip or eliminate a trunk group or subgroup from its trunk searching operation.

Figure 8:
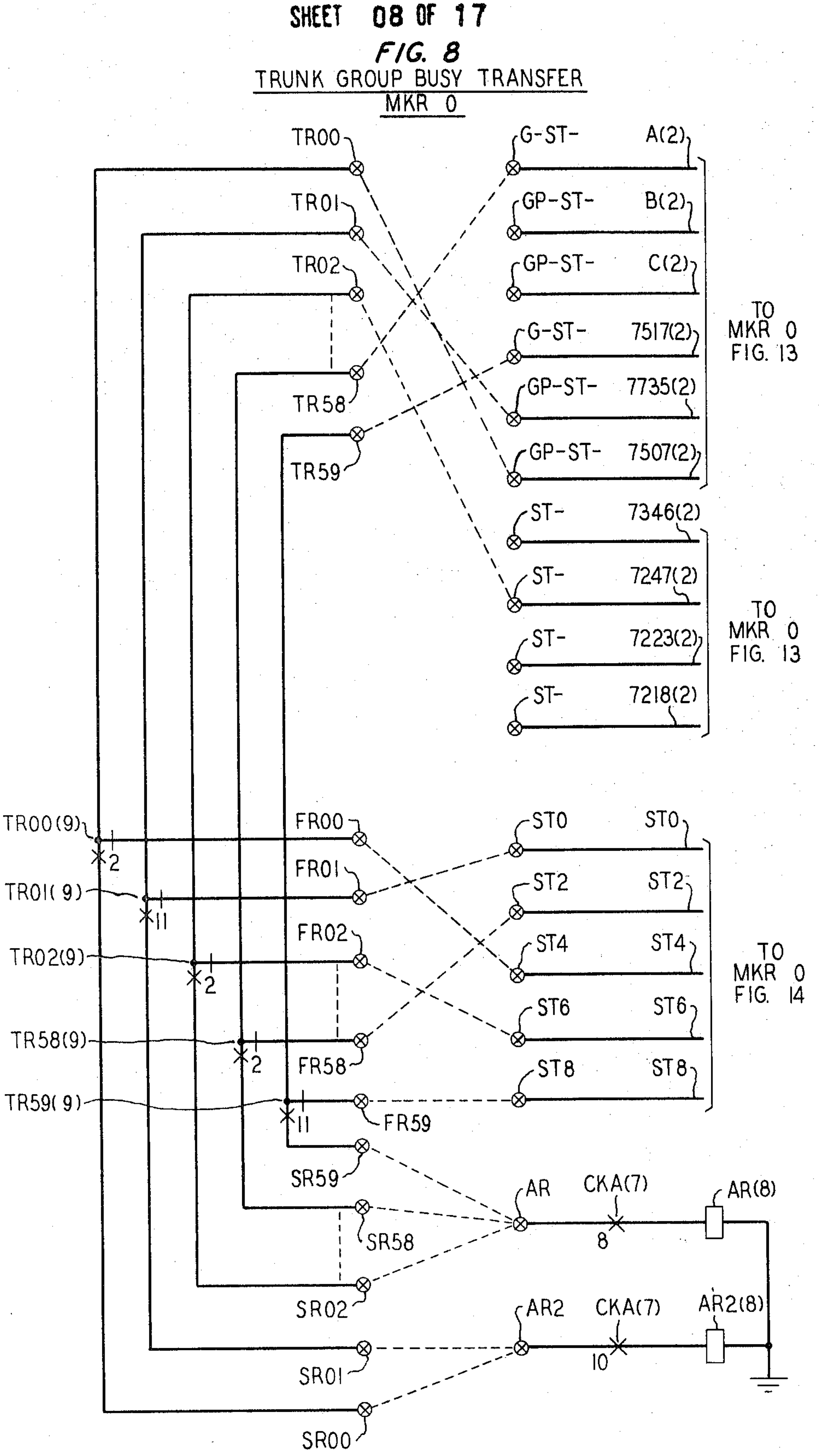

When the marker attempts to seize an office frame, as previously discussed, one of the leads 7018, 7109, 7140 and 7128 into FIG. 13 from FIG. 12 will have resistance battery applied thereto. In FIG. 13, with switch S in position 2, the office frame start battery will extend over a make contact of the operated route relay R—(M)——(—) either directly to one of the leads 7218(2), 7223(2), 7247(2) and 7346(2) into FIG. 8 or over a make contact of one of the grouping relays GPOA(M)7500(—), GP1A(M)7502(—) and GOA(M)7530(—) through G11A(M)7441(—) to one of the leads A(2), 7517(2), B(2), C(2), 7507(2) and 7735(2) into FIG. 8. In FIG. 8, these ten leads from FIG. 13 appear at respective ones of the terminals G-ST-, GP-ST-, and ST-. These terminals are cross-connected to terminals TR00 through TR59 according to the assignment of the relays TR00(9) through TR59(9) to the trunk groups or subgroups represented by the ten start leads from FIG. 13. The terminals TR00 through TR59 connect to transfer contacts 2 or 11 of the corresponding relay TR00(9) through TR59(9), the break contacts of which connect to terminals FR00 through FR59 and the make contacts of which connect to terminals SR00 through SR59. If the pertinent relay TR—(9) is released, the start lead will extend over the break contact of that relay TR—(9) to the corresponding terminal FR—, thence by a suitably cross-connection to the pertinent one of the office link start leads STO through ST8 into FIG. 14, thereby to cause seizure of the proper pair of office frames preparatory to a search by the marker for an idle trunk, all as previously described.

As an example, when the marker attempts to seize a pair of office frames to search for an idle trunk in the first subgroup of trunks of the two first choice subgroups for the route corresponding to the operated route relay R—(M)7300(—), assuming that grouping relay GPOA(M)7500(—) is operated, relay GT1(M)5109(17) will be operated, and relay GT3(M)5111(17) will be released (thus, relay GT(7) will be released), all as previously described. The office start lead 7735(2) from FIG. 13 into FIG. 8 will be energized and will extend in FIG. 8 to terminal TR01, assuming that relay TR01(9) is assigned to that subgroup of trunks, thence over break contact 11 of relay TR01(9), assuming that relay TR01(9) is not operated, thence to terminal FR01, cross-connection to terminal ST0, and over lead ST0 into FIG. 14 and over position 2 of switch S to the office frame start lead 7735, ST0.

As a result of the energization of start lead ST0 to the office link connector in FIG. 14, the marker will search among the proper trunks either for an idle trunk or for an all-trunks-busy condition. If an idle trunk is found, the marker completes its connecting functions and is released from the sender, whereupon its route relay R—(M)7300(—), is released, along with relays CK4(M)5104(—), SR(M)5417(—), CKA(7) and C01(7).

If the marker finds an all-trunks-busy condition in the first subgroup, the new relay TBL(M)17 comes into play. It will be recalled from prior description, if such an all-trunks-busy condition is found during the marker searching function, that lead 6307 in FIG. 17 was grounded from the trunk test relays to cause the operation of relay GT2(M)5110(17), et cetera to cuase the marker to advance to search among the second subgroup for the route corresponding to route relay R—(M)7300(—). In FIG. 17, with switch S in position 2, the grounded lead 6307 operates relay TBL(M)17 through its upper-primary winding, relay TBL(M)17 locking by way of its upper winding, its make contact 6, and position 2 of switch S to ground over make contact L1 of relay PT(M)6111(—), and locking by way of its lower winding, its make contact 2, and position 2 of switch S to ground on lead 5136 from the district frame connector. Relay TBL(M)17, in operating, causes the operation in FIG. 17 of relay GT2(M)5110(17) from ground in FIG. 17, over make contact 7 of relay TBL(M)17, position 2 of switch S, lead 6307, break contacts R3 of relays BE1(M)5907(—) and B01(M)5908(— ), lead 5920, make contact R1 of relay GT1(M)5109(17), and to battery through the winding of relay GT2(M)5110(17). Thus, the operated relay TBL(M)17 has initiated the trunks-busy-cycle of the marker just as in the unmodified prior art situation. The operation of relay GT2(M)5110(17) causes the release of grouping relay GP0A(M)7500(—) to open the start lead 7735(2) from FIG. 13 into FIG. 8, thus to release the office and district frame connections. This is followed by the release of relay PT(M)6111(—), which releases relay TBL(M)17 and operates relay GT3(M)5111(17), thus to operate and lock relay GT(7). The operation of relay GT3(M)5111(17) causes circuit functioning which includes the release of relays GT1(M)5109(17) and GT2(M)5110(17), which causes the operation of the grouping relay GP1A(M)7502(—), all as previously described.

The marker will now apply resistance battery to lead 7507(2) from FIG. 13 into FIG. 8 under the control of the operated route relay R—(M)7300(—) and the operated grouping relay GP1A(M)7502(—). In FIG. 8, the energized lead 7507(2) from FIG. 13 extends by cross-connection in FIG. 8 to terminal TR00, assuming that the second subgroup of the direct route is assigned to relay TR00(9), thence over break contact 2 of relay TR00(9), assuming it to be released, and by cross-connection to the office link start lead ST4 into FIG. 14 for seizure of the pertinent pair of office frames, et cetera as previously described.

If the marker finds an idle trunk in the second subgroup for the direct route, the connection will be made followed by the release from the sender of the marker, including the release of route relay R—(M)7300(—) and the release of relays CK4(M)5104(—), SR(M)5417(—), CKA(7), C01(7) and GT(7).

If the marker finds an all-trunks-busy condition in the second subgroup for the direct route, relay TBL(M)17 will be operated as above described. Since relay GT1(M)5109(17) is then released, the operation of relay TBL(M)17, instead of operating relay GT2(M)5110(17), will operate relay TB(M)5107(17) over break contact R1 of relay GT1(M)5109(17) in FIG. 17.

The operation of relay TB(M)5107(17), as previously described, causes the marker to perform its trunks-busy-cycle so as to release from the office frame, to operate an additional alternate route relay R—(M)7200(—), to operate one of the grouping relays GOA(M)7530(—) through G11A(M)7441(—), and to energize another start lead, such as lead 7517(2) from FIG. 13 into FIG. 8. In FIG. 8, start lead 7517(2) cross-connects to terminal TR59, assuming that the first choice subgroup of the alternate route is assigned to relay TR59(9), thence over break contact 11 of relay TR59(9), assuming it to be released, thence to the office link start lead ST8 into FIG. 14 at the office link connector circuit.

The marker proceeds as before to seize the pertinent pair of office frames, to search for an idle trunk, to complete the connection if an idle trunk is selected, and to again go through its trunks-busy-cycle if an all-trunks-busy condition is found.

It will be appreciated from the above, as long as no pertinent relay TR—(9) is operated, that the marker operation is not changed from the prior art context except that relay TBL(M)17 of FIG. 17 acts as an intermediate agency for control purposes in the event that lead 6307 in FIG. 17 is grounded by the trunk test relays to indicate the all-trunks-busy condition.

Operation With Relay TR—(9) Operated

If a pertinent one of the relays TR00(9) through TR59(9) is operated when the marker extends the resistance battery toward the office link connector, the relays of FIGS. 7 and 8 come into play to cause the marker to skip trunk searching in any group or subgroup of trunks represented by an operated TR—(9) relay.

Assume that the marker is about to seize the office frames for trunk searching in the first subgroup of direct route trunks corresponding to the operated route relay R—(M)7300(—) and the operated grouping relay GPOA(M)7500(—), with relay TR01(9) locked operated in FIG. 9 under the control of the operated relay CKA(7). Under these conditions cut-off relay C01(7) will be operated, relay GT1(M)5109(17) will be operated, and relays GT2(M)5110(17) and GT3(M)5111(17) will be released.

In FIG. 8, the energized start lead 7735(2) from FIG. 13 extends, as before, to terminal TR01 and thence to the transfer contacts 11 of relay TR01(9). With relay TR01(9) operated, indicating an all-trunks-busy condition, whether true or false, in the pertinent subgroup of trunks, the start battery extends over make contact 11 of relay TR01(9) to terminal SR01.

Relay AR2(8) is assigned to any trunk group divided into two subgroups where advance to alternate route is required if both subgroups are tested or indicated as busy. Relay AR(8) is assigned (1) to any trunk group which is not divided where advance to alternate route is required if the group is tested or indicated as busy and (2) to any trunk group which is divided into more then two subgroups where advance to alternate route is required if any subgroup is tested or indicated as busy.

In the situation under discussion, the direct route represented by route relay R—(M)7300(—) is divided into two subgroups with advance to alternate route required if both subgroups are busy, thus requiring terminal SR01 in FIG. 8 to be cross-connected to terminal AR2 so as to cause the operation of relay AR2(8) under the control of make contact 10 of relay CKA(7). The operation of relay AR2(8) closes its make contacts 1 in FIG. 7 to connect together leads REG and REG1 into FIG. 11 to allow the operation of peg count register PC(TR)7349(11), relay JD(M)5720(—) being released since the marker will not prepare to seize the office frames as it would if trunk searching were to take place as in the prior art.

The operation of relay AR2(8) causes the marker to go through its trunks-busy cycle just as though the marker had prepared its trunk searching function and had found an all-trunks-busy condition. Thus, the operation of relay AR2(8) causes the marker to skip or eliminate this particular subgroup of trunks from its trunk searching function due to the operation of relay TR01(9) from the group busy timed memory of FIG. 2; and, the skipping is thus done regardless of the actual (at the moment) idle or busy condition of the trunk subgroup. Relay AR2(8), in operating, causes the operation of relay AR1(7) in an obvious circuit in FIG. 7 over make contact 5 of relay AR2(8). Relay AR1(7) locks over its make contact 1, break contact 9 of relay TB(7), lead GT2 into FIG. 18, break contact R2 of relay GT3(M)5111(17), lead GT1 into FIG. 7, and to ground over make contact 5 of relay CKA(7). Make contact 3 of relay AR1(7) in FIG. 7 closes another circuit across leads REG and REG1 into FIG. 11 to maintain control over the peg count and overflow register circuits.

The operation of relay AR1(7) completes a circuit for operating relay TBL(M)(17) from ground in FIG. 18, over make contact R2 of relay GT1(M)5109(17), lead GTG into FIG. 7, over make contact 4 of relay AR2(8), make contact 5 of relay AR1(7), lead TBL into FIG. 17, to the upper winding of relay TBL(M)(17), which operates as though it had been operated from the trunk test relays in FIG. 17 due to an all-trunks-busy condition found during an actual trunk searching operation. No locking circuit is available to relay TBL(M)(17) over its make contacts 6 or 2 since relay PT(M)6111(—) is released and since no district frame connection has been established; so, relay TBL(M)(17) remains operated under the control of relays AR1(7), AR2(8) and GT1(M)5109(17).

The operation of relay TBL(M)17 applies ground in FIG. 17 over its make contact 7 and position 2 of switch S to operate relay GT2(M)5110(17) under the control of make contact of the operated relay GT1(M)5109(17), just as though relay TBL(M)(17) had been operated due to a trunk searching operation having found an all-trunks-busy condition.

The operation of relay GT2(M)5110(17) causes the marker to release its grouping relay GPOA(M)7500(—) to open the office link start lead 7735(2) from FIG. 13 into FIG. 8, thus to release relay AR2(8), leaving relay TBL(M)(17) locked to ground in FIG. 7 under the control of make contact 5 of relay AR1(7) and break contact 4 of relay AR2(8). Eventually, relay GT3(M)5111(17) operates under the control of the released relay PT(M)6111(—) and the operated relays GT1(M)5109(17) and GT2(M)5110(17). The operation of relay GT3(M)5111(17) opens, at its break contact R2 in FIG. 18, the ground circuit from lead GT1 to lead GT2, thus to allow relay AR1(7) to release. When relay AR1(7) releases, its make contact 1 in FIG. 7 opens the last circuit across leads REG and REG1 into FIG. 11, and its break contact 4 in FIG. 7 allows relay GT(7) to operate from ground on lead GT3 from FIG. 18, over make contact R2 of relay GT3(M)5111(17), lead GT1 into FIG. 7 and over make contact 5 of relay CKA(7). Relay GT(7) locks over its make contact 4 to the ground on lead GT3 and connects lead REG and REG1 (FIG. 7 into FIG. 11) together again over its make contact 3 in FIG. 7.

When relay AR1(7) releases, relay TBL(M)(17) releases to cause the release of relays GT1(M)5109(17) and GT2(M)5110(17). The release of relay GT2(M)5110(17), as previously discussed, causes the operation of the next grouping relay GP1A(M)7502(—) to allow the marker to energize the next office link start control lead 7507(2) from FIG. 13 into FIG. 8.

The net result of the foregoing is the same as though the marker had actually seized a pair of office frames, searched the subgroup of trunks, found an all-trunks-busy condition, and performed its trunks-busy cycle to initiate another office frame seizure to search among the second subgroup for the direct route. The only difference is that relay GT(7) remains locked operated under the control of the operated relays CKA(7) and GT3(M)5111(17). The operated relay GT(7) is a reminder that the trunk-group busy transfer circuitry of FIGS. 7 through 10 has already caused the marker to go through its trunks-busy cycle for the first of the two subgroups of trunks in the direct route.

When the marker energizes the new start lead 7507(2) from FIG. 13 into FIG. 8, regarding office frame seizure for searching the second subgroup of trunks for the direct route, which subgroup corresponds to relay TR00(9), let it be assumed that relay TR00(9) is locked operated in FIG. 9 to indicate that this subgroup is also busy, as it would be if relays TR00(9) and TR01(9) are both operated. In FIG. 8, the resistance battery on terminal TR00 extends over make contact 2 of relay TR00(9) to terminal SR00; and, since this subgroup belongs to the direct route group which is divided into two subgroups and which requires advance to alternate route if both subgroups are busy, terminal SR00 is cross-connected to terminal AR2 to cause the reoperation of relay AR2(8). Relay AR2(8), in operating, closes its make contact 1 in FIG. 7 to add another connection between leads REG and REG1 into FIG. 11 and causes relay AR1(7) to reoperate, to also connect leads REG and REG1 over its make contact 3. Relay AR1(7), in operating, locks over its make contact 1, break contact 9 of relay TB(7), make contact 1 of relay GT(7), to ground over make contact 5 of relay CKA(7).

With relays GT(7) and AR1(7) operated, relay TBL(M)(17) operates in a circuit extending from ground in FIG. 7, over make contact 2 of relay GT(7), make contact 5 of relay AR1(7), lead TBL into FIG. 17, to the upper winding of relay TBL(M)(17). In FIG. 17, with relay GT1(M)5109(17) released, the operation of relay TBL(M)(17) causes the operation of the trunk busy relay TB(M)5107(17). The operation of relay TB(M)5107(17) causes the operation of relay TB(7) in a circuit extending from ground in FIG. 18, over make contact R2 of relay TB(M)5107(17), lead 5147, position 2 of switch S, lead TB into FIG. 7, over make contact 2 of relay AR1(7), to battery through the winding of relay TB(7). Relay TB(7) operates and locks over its own make contact 8 to ground on lead TB from FIG. 18. In FIG. 7, make contact 12 of relay TB(7) adds another connection between leads REG and REG1 into FIG. 11. The operation of relay TB(M)5107(17) causes the release of relay GT3(M)5111(17), which in turn causes the release of relay GT(7).

With relay TB(M)5107(17) operated and relay G1(M)7002(—) released, relay TB1(M)7003(—) is operated to allow control over the relay E00(TR)(11) and the overflow traffic register OF(TR)7350(11), as previously described.

Eventually, with the operation of relay TB1(M)7003(—), the ground supply relay G1(M)7002(—) is operated to remove the resistance battery in FIG. 12 from lead 7018 into FIG. 13, thus to remove this start battery from the office link start lead 7507(2) from FIG. 13 into FIG. 8, thus to allow relay AR2(8) to release. The release of relay AR2(8) allows relay AR1(7) to release, which in turn allows relay TBL(M)(17) to release. The release of relay TBL(M)(17) causes relay TB(M)5107(17) to release, to in turn release relays TB(7) and TB1(M)7003(—), the release of relay TB(7) removing in FIG. 7 the last connection between leads REG and REG1 into FIG. 11.

Upon the release of relay TB1(M)7003(—), the marker completes its trunks-busy cycle by operating the alternate route relay R—(M)7200(—) with direct route relay R—(M)7300(—) still operated. This causes the energization in FIG. 13, assuming grouping relay GOA(M)7530(—) to be operated, of another office link start lead 7517(2) into FIG. 8 and to terminal TR59, assuming relay TR59(9) is assigned to the first choice subgroup of the alternate route. If relay TR59(9) is locked operated in FIG. 9, the start battery on terminal TR59 in FIG. 8 extends over make contact 11 of relay TR59(9) to terminal SR59, which is cross-connected to terminal AR to cause the operation of relay AR(8) since the first choice subgroup of the alternate route is part of a trunk group divided into more than two subgroups with advance to alternate route (the second choice subgroup) required if the first choice subgroup is busy. Relay AR(8), in operating, closes a connection in FIG. 7 over its make contact 12 between leads REG and REG1 into FIG. 11 for control, if necessary, of peg count and overflow traffic registers.

The operation of relay AR(8) causes the marker to perform its trunks-busy cycle without the necessity of trunk searching. Relay AR1(7) operates over make contact 8 of relay AR(8), thus closing another circuit in FIG. 7 over its make contact 3 for leads REG and REG1, and locks over its make contact 1, break contact 9 of relay RB(7), lead GT2 into FIG. 18, over break contact R2 of relay GT3(M)5111(17), lead GT1 into FIG. 7, to ground over make contact 5 of relay CKA(7). With relay AR2(8) released, the operation of relay AR1(7) causes the operation of relay TBL(M)(17) in a circuit from ground in FIG. 7, over break contact 4 of relay AR2(8), make contact 5 of relay AR1(7), lead TBL into FIG. 17 to the upper winding of relay TBL(M)(17). The operation of relay TBL(M)(17) causes the operation of relay TB(M)5107(17), as previously, under the control of break contact R1 of relay GT1(M)5109(17). With relay AR1(7) operated, the operation of relay TB(M)5107(17) causes the operation of relay TB(7), as previously, relay TB(7) locking under the control of its own make contact 8 and make contact R2 in FIG. 18 of relay TB(M)5107(17).

With relay TB(M)5107(17) operated, relay TB3(M)7103(—) is operated to control relay E59(TR)(11) in FIG. 11 over make contact R13 of route relay R—(M)7200(—) and make contact L1 of relay GOA(M)7530(—). Eventually, ground supply relay G3(M)7102(—) operates under the control of the operated relay TB3(M)7103(—) to open the office link start lead 7517(2) from FIG. 13 into FIG. 8, thus to allow relay AR(8) to release. The release of relay AR(8) allows relay AR1(7) to release, which in turn allows relay TBL(M)(17) to release. The release of relay TBL(M)(17) allows relay TB(M)5107(17) to release, which allows relay TB(7) to release. The release of relay TB(7) opens the last connection between leads REG and REG1 from FIG. 7 into FIG. 11 and the release of relay TB(M)5107(17) causes the release of relay TB3(M)7103(—). The marker thereupon causes the operation of the route relay R—(M)7201(—) to energize still another start lead 7218(2) from FIG. 13 into FIG. 8.

The above process continues until the marker either finds and selects an idle trunk in one of the successive alternate route trunk subroups or causes its release from the sender on a trouble release basis due to no trunk available. When the marker is eventually released from the sender, all of the relays of the circuitry of FIGS. 7 through 10 will have been released; and, the TR—(9) relays of FIG. 9 are again able to be controlled from the group busy circuit of FIG. 4.

Summary of Control by Relays TR—(9)

It will be seen from the prior description that when the prior art is modified according to the exemplary embodiment of the invention, any marker is controlled by any trunk group busy indication supplied from the group busy circuit so that the marker skips or eliminates from its trunk searching operation any pertinent trunk group with respect to which the marker has ascertained an indication of an all-trunks-busy condition. If a marker has no indication of such a busy condition of a pertinent trunk group or subgroup, the marker will, as in the prior art, initiate its usual trunk searching operation.

The skipping function provided by the exemplary embodiment in effect causes a marker to go through its trunks-busy cycle just as though the marker had actually tested the pertinent trunks and had found an all-trunks-busy condition. Thus, considerable marker holding time is saved by eliminating from its trunk searching operation those groups or subgroups of trunks likely not to contain an idle trunk.

It will be appreciated that until the timer in FIG. 6 of the group busy circuit times-out, none of the associated group busy relays GB— of FIGS. 2 and 3 will be released. Also, when such GB— relays are released, only the first one operated will have been held operated for the full time-out period. Furthermore, even though one or more GB— relays are held operated until time-out, the related trunk groups or subgroups may not necessarily have remained in an all-trunks-busy condition for the full time of operation of the associated GB— relay. Also, once the TR— relays of FIG. 9 of a marker have been locked operated, that marker will contain an indication of an all-trunks-busy condition in the corresponding groups or subgroups even though the GB— relays of FIGS. 2 and 3 may have been released or even though the related groups or subgroups may not still have actual all-trunks-busy conditions. As has been mentioned previously, the trunk groups and subgroups may be assigned to different group busy timers and the timers may be assigned any desired time-out intervals so as to provide to the markers all-trunks-busy information which, although it may not be correct when used, is sufficiently accurate so that the saving in wiring and maintaining costs outweighs the effects of allowing markers to operate with information which may not actually be true when used.

Miscellaneous Remarks

In FIG. 7 is shown a lead TST at the right side of the winding of the cut-off relay CO1(7). This lead may be grounded at any time for such purposes as testing. In such a case the cut-off CO1(7) will be operated to open all of the circuits in FIG. 9 between the group busy circuit of FIG. 4 and the TR— relays of FIG. 9. This will occur when relay CKA(7) is not operated, thus releasing any operated relays TR— so as to cancel the trunk group busy transfer feature during such testing.

In FIG. 11, the connection between leads REG and REG1 from FIG. 7 is completed under the control of relays AR2(8), AR1(7), AR(8), TB(7) and GT(7) in order that the peg count and overflow registers may be controlled, where necessary, in FIG. 11 even though relay JD(M)5720(—) is not operated since the marker will not, under circumstances described previously, have proceeded to its office frame seizure operation.

In FIG. 15, whenever relay TBL(M)(17) is operated, its break contact 1 opens the circuit to the windings of all of the K-relays to prevent the operation of any such relay if a trunk should become idle during the trunks-busy route advance cycle of the marker.

In FIG. 15, the operation of relay TBL(M)(17) opens, at its break contact 4, the circuit to lead 5125 which controls the transmitting leads to the sender. This releases the sender relays and allows time for the energy in their windings to dissipate before the trunks-busy cycle reconnects the relays XT(M)6717(15) and XT1(M)6718(15) to those transmitting leads.

In FIG. 16, the operation of relay TBL(M)(17), at its break contact 5, prevents a possible false operation of the district link relay JC(DF)2160(16) due to a possible race condition occurring during the marker trunks-busy cycle.

It is to be understood that the above-described arrangement is illustrative of the application of the principles of the invention. Other arrangements may be devised by those skilled in the art without departing from the spirit and scope of the invention.

For example, the principles of the invention may readily be embodied in any switching system involving control circuitry whose functions include the finding of an idle outlet in a switching network, whether such an outlet is a line, trunk, terminal, et cetera.

Also, such a switching system may be local, toll, tandem, private branch exchange, et cetera. Furthermore, such a switching system may involve telephony, telegraphy, data, video, radio link, et cetera, may be public or private, and may be electronic as distinguished from the electromechanical nature of the exemplary embodiment.

In addition, the invention may be employed in a trunking arrangement less sophisticated than the exemplary disclosure, such as where no subdivision of trunk groups is involved. In such an arrangement, each trunk group could be assigned to its own route relay which could operate a peg count traffic register when the trunk group is about to be searched and which could operate an E— relay and an overflow register if the trunk group is found busy. In such an arrangement, there would not need to be any paralleling of relays GB— and would not need to be any separate control of relays E— by grouping relays. Relay AR(8) would be the only relay controlled by the transfer cross-connections of FIG. 8 since relay AR2(8) is used only where a trunk group is divided into two subgroups and advance to alternate route is required only if both subgroups are busy.

Other variations of the use of the invention will occur to those skilled in the art.

What is claimed is:

1. A switching system having a switching network; a plurality of groups of outlets terminating in the network, each group representing a switching route toward a switching destination; and, a plurality of control circuits, each control circuit effective, incident to registration therein of a signal designating a particular switching destination, to initiate a searching operation for an idle outlet in at least one group representing a switching route toward the particular switching destination; wherein the improvement comprises A. means controlled by any control circuit, upon the control circuit finding an all-outlets-busy condition in a searched group, for storing an indication of the busy condition of the searched group;

B. means for erasing a stored group busy indication within a prescribed time interval independent of the time duration during which the actual group busy condition exists;

C. and, means in each control circuit controlled by any group busy indication stored in the storing means for eliminating the indicated group from the searching operation of the control circuit.

2. The invention defined in claim 1 wherein

A. the storing means is common to all control circuits;

B. the erasing means is included in the storing means;

C. and, the eliminating means comprises 1. means controlled by the storing means for ascertaining any stored group busy indication
2. and means controlled by the ascertaining means for eliminating the indicated group from the searching operation.

3. The invention defined in claim 2 wherein the ascertaining means is controlled by the storing means prior to the initiation of any searching operation.

4. The invention defined in claim 2 wherein

A. the erasing means comprises a timer energizable to measure a prescribed time interval and to provide an erasing signal at the end of the said time interval;

B. the timer is energized by the storing means upon the storing of a group busy indication;

C. and, the erasing signal erases the stored group busy indication.

5. The invention defined in claim 1 wherein

A. the storing means comprises a plurality of storage means common to all control circuits, each storage means being individual to a different plurality of groups of outlets;

B. the erasing means comprises a plurality of erasure means, each erasure means being individual to and included in a different storage means;

C. and, the eliminating means comprises 1. means controlled by any storage means for ascertaining any stored group busy indication
2. and means controlled by the ascertaining means for eliminating the indicated group from the searching operation.

6. The invention defined in claim 5 wherein the ascertaining means is controlled by the storage means prior to the initiation of any searching operation.

7. The invention defined in claim 5 wherein

A. each erasure means comprises a timer energizable to measure a prescribed time interval and to provide an erasure signal at the end of the said time interval;

B. each timer is energized by the corresponding storage means upon the storing in the said corresponding storage means of a group busy indication;

C. and, each erasure signal erases the group busy indication stored in the corresponding storage means.

8. A switching system having a switching network; a plurality of outlets terminating in the network, each group representing a switching route toward a switching destination; and, a plurality of control circuits, each control circuit effective, incident to registration therein of a signal designating a particular switching destination for which a plurality of groups of outlets represent an alternate switching route searching pattern, to initiate a searching operation for an idle outlet among the groups of the alternate route pattern in a fixed order of groups and to advance the searching operation from one group to the next group in the said fixed order upon finding an all-outlets-busy condition in the one group; wherein the improvement comprises A. means controlled by any control circuit, upon the control circuit finding an all-outlets-busy condition in a searched group, for storing an indication of the busy condition of the searched group;
B. means for erasing a stored group busy indication within a prescribed time interval independent of the time duration during which the actual group busy condition exists;
C. and, means in each control circuit controlled by any group busy indication stored in the storing means for skipping the indicated group during the alternate route advance operation of the control circuit.

9. The invention defined in claim 8 wherein

A. the storing means is common to all control circuits;
B. the erasing means is included in the storing means;
C. and, the skipping means comprises
   1. means controlled by the storing means for ascertaining any stored group busy indication
   2. and means controlled by the ascertaining means for skipping the indicated group during the alternate route advance operation.

10. The invention defined in claim 9 wherein the ascertaining means is controlled by the storing means prior to initiation of any searching operation.

11. The invention defined in claim 9 wherein

A. the erasing means comprises a timer energizable to measure a prescribed time interval and to provide an erasing signal at the end of the said time interval;
B. the timer is energized by the storing means upon the storing of a group busy indication;
C. and, the erasing signal erases the stored group busy indication.

12. The invention defined in claim 8 wherein

A. the storing means comprises a plurality of storage means common to all control circuits, each storage means being individual to a different plurality of groups of outlets;
B. the erasing means comprises a plurality of erasure means, each erasure means being individual to and included in a different storage means;
C. and, the skipping means comprises
   1. means controlled by any storage means for ascertaining any stored group busy indication
   2. and means controlled by the ascertaining means for skipping the indicated group during the alternate route advance operation.

13. The invention defined in claim 12 wherein the ascertaining means is controlled by the storage means prior to initiation of any searching operation.

14. The invention defined in claim 12 wherein

A. each erasure means comprises a timer energizable to measure a prescribed time interval and to provide an erasure signal at the end of the said time interval;
B. each timer is energized by the corresponding storage means upon the storing in the said corresponding storage means of a group busy indication;
C. and, each erasure signal erases the group busy indication stored in the corresponding storage means.

* * * * *